(12) United States Patent
Bauch

(10) Patent No.: US 7,616,703 B2
(45) Date of Patent: Nov. 10, 2009

(54) DIFFERENTIAL MULTIPLE-NORM TRANSMIT DIVERSITY WITH FORWARD ERROR CORRECTION AND RELATED DIVERSITY RECEPTION

(75) Inventor: Gerhard Bauch, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 603 days.

(21) Appl. No.: 10/545,568

(22) PCT Filed: Aug. 19, 2003

(86) PCT No.: PCT/EP03/09180

§ 371 (c)(1),
(2), (4) Date: Feb. 20, 2006

(87) PCT Pub. No.: WO2004/073249

PCT Pub. Date: Aug. 26, 2004

(65) Prior Publication Data

US 2006/0232416 A1    Oct. 19, 2006

(30) Foreign Application Priority Data

Feb. 13, 2003    (WO) ...................... PCT/EP03/01439

(51) Int. Cl.
*H04L 27/00* (2006.01)
(52) U.S. Cl. ...................................... 375/299
(58) Field of Classification Search ................ 375/299, 375/267, 347

See application file for complete search history.

(56) References Cited

U.S. PATENT DOCUMENTS 6,724,842 B1 *  4/2004  Hochwald et al. ........... 375/347
(Continued)

FOREIGN PATENT DOCUMENTS

WO    WO 02/052773 A1    7/2002
(Continued)

OTHER PUBLICATIONS

International Search Report dated Dec. 29, 2003.
(Continued)

*Primary Examiner*—Kevin Y Kim
(74) *Attorney, Agent, or Firm*—Nutter McClennen & Fish LLP; John J. Penny, Jr.

(57) ABSTRACT

To provide transmission and reception diversity schemes for a powerful, flexible and less complex bandwidth-efficient space-time modulation scheme there is proposed a method of and apparatus for differential multiple-norm space-time transmit diversity from a unitary space-time modulation scheme using at least two transmit antennas. In a first step a group of transmission bits is divided into a first sub-group of transmission bits and a second sub-group of transmission bits. In a second step the first sub-group of transmission bits is mapped onto a constellation matrix of a differential unitary space-time modulation scheme. In a third step a scaling factor is determined from the second sub-group of transmission bits. In a fourth step a transmission matrix is sep up through differential encoding of the constellation matrix and a previously determined transmission matrix in combination with scaling by the scaling factor. The differential multiple-norm transmit diversity according to the present invention improves distance properties of the modulation scheme which are relevant for achievable error rates and extends higher order modulation also to the area of differential transmit diversity schemes from unitary designs.

27 Claims, 12 Drawing Sheets

U.S. PATENT DOCUMENTS 6,801,579 B1 * 10/2004 Hassibi et al. .............. 375/264
7,170,954 B2 * 1/2007 Hassibi et al. .............. 375/299

FOREIGN PATENT DOCUMENTS

WO     WO 02/061952 A1     8/2002
WO     WO 2004/073247 A1     8/2004

OTHER PUBLICATIONS

International Preliminary Examination Report dated May 12, 2005.
Foschini, et al., "On Limits of Wireless Communications in a Fading Environment when Using Multiple Antennas," Wireless Personal Communications 6:311-335 (1998).
Telatar, "Capacity of Multi-Antenna Gaussian Channels," Communication Theory, 10:585-595 (1999).
Tarokh, et al., "A Differential Detection Scheme for Transmit Delivery," IEEE Journal on Selected Areas in Communications, 18:1169-1.174 (2000).
Hughes, "Differential Space-Time Modulation," IEEE Transactions on Information Theory, 46:2567-2578 (2000).
Hochwald, et al., "Differential Unitary Space-Time Modulation," IEEE Transactions on Communications, 48:2041-2052 (2000).
Jafarkhani, et al., "Multiple Transmit Antenna Differential Detection From Generalized Orthogonal Designs," IEEE Transactions on Information Theory, 47:2626-2631 (2001).
Steiner, et al., "Iterative Decoding of Space-Time Differentially Coded Unitary Matrix Modulation," IEEE Transactions on Signal Processing, 50:2385-2395 (2002).
Xia, "Differentially En/Decoded Orthogonal Space-Time Block Codes With APSK Signals," IEEE Communications Letters, 6:150-152 (2002).
Rohling, et al., "Differential Amplitude Phase Shift Keying (DAPSK)—A New Modulation Method for DTVB," International Broadcasting Convention, pp. 102-108 (1995).
Tonello, "Performance of Space-Time Bit-Interleaved Codes in Fading Channels with Simplified Iterative Decoding," IEEE, pp. 1357-1361 (2001).
Bahceci, et al., "Combined Turbo Coding and Unitary Space-Time Modulation," IEEE Transactions on Communications, 50:1244-1249 (2002).
Hagenauer, "Rate-Compatible Punctured Convolutional Codes (RCPC Codes) and Their Applications," IEEE Transactions on Communications, 36:389-400-(1988).

* cited by examiner

DIFFERENTIAL MULTIPLE-NORM TRANSMIT DIVERSITY WITH FORWARD ERROR CORRECTION AND RELATED DIVERSITY RECEPTION

FIELD OF INVENTION

The present invention relates to differential multiple-norm transmit diversity with forward error correction and related diversity reception.

BACKGROUND ART

The usage of multiple antennas at both ends of the wireless link has been shown to provide significant capacity gains in fading environments, G. J. Foschini and M. J. Gans, *On Limits of Wireless Communications in a Fading Environment when Using Multiple Antennas, Wireless Personal Communications*, 6:311-335, 1998 and E. Teletar, *Capacity of Multi-antenna Gaussian Channels, European Transactions on Telecommunications (ETT)*, 10(6), November/December 1999.

A variety of multiple-input multiple-output MIMO schemes including space-time codes and spatial multiplexing have been proposed in order to exploit those capacities. However, most multiple-input multiple-output MIMO techniques require knowledge of the channel coefficients at the receiver, which knowledge may be obtained from a channel estimation. However, channel estimation is a more sever problem in multiple-input multiple-output MIMO systems than in single antenna systems since more subchannels have to be estimated and the energy of pilot symbols has to be distributed over several October 2002.

Further, differential transmit diversity with multiple amplitude levels was proposed in X.-G. Xia, *Differential En/Decoded Orthogonal Space-Time Block Codes with A PSK Signals, IEEE Communications Letters*, 6(4):150-152, April 2002, and uses DAPSK signals as proposed in H. Rohling and V. Engels, *Differential Amplitude Phase Shift Keying (DAPSK)—A New Modulation method for DTVB, International Broadcasting Convention*, pp. 102-108, 1995 as input for a unitary space-time modulator according to B. Hochwald and W. Swelden, *Differential Unitary Space-Time Modulation, IEEE Transactions on Communications*, 48(12):2041-2052. Here, an outer forward error correction FEC coding is not considered.

Further, in D2, Tonello A. M "Performance of Space-Time Bit-Interleaved Codes in Fading Channels with Simplified Iterative Decoding". Here, decoding is based on iterative demapping and decoding, wherein the demapper delivers soft information to the decoder and accepts feedback from the decoder.

Still further, in WO 02/061952 A1 there is described a turbo encoder with transmitter diversity employing space-time spreading transmission to improve transmission error performance and efficiency in addressing multi-path fading.

SUMMARY OF INVENTION

In view of the above, the first object of the present invention is to provide transmission and reception diversity schemes for a powerful, flexible and less complex bandwidth-efficient space-time modulation scheme.

Further, a second object of the present invention is to provide a channel coding scheme with forward error correction in combination with transmission and reception diversity schemes.

According to a first aspect of the present invention, the first object is achieved through a method of differential multiple-norm space-time transmit diversity from a unitary space-time modulation scheme using at least two transmit antennas having the features of claim 1.

Therefore, the present invention overcomes restrictions implied through unit norm requirements for previously known differential transmit diversity schemes from unitary designs. In particular, the differential multiple-norm transmit diversity improves distance properties of the modulation scheme which are relevant for achievable error rates and extends higher order modulation also to the area of differential transmit diversity schemes from unitary designs.

Another advantage of the present invention is that differential multiple-norm transmit diversity allows for a much more flexible range of data rates. In particular, using two sub-groups of transmission bits the number of information bits may freely selected before assignment to unitary space-time modulation schemes and subsequent transmission thereof.

Yet another advantage of the present invention is lower detection complexity as after transmission the number of comparisons with possible transmission matrices at the receiver side is significantly reduced compared to unit norm differential transmit diversity schemes.

Yet another advantage of the present invention is better performance than unitary space-time modulation, particularity in time-varying transmission channels or with OFDM transmission over frequency selective transmission channels.

According to the present invention the second sub-group of transmission bits is coded into a, norm difference of two successive transmission matrices.

An important advantage of this preferred embodiment is that coding into a norm difference supports diversity reception without mandatory application of channel estimation techniques and therefore simple detection. This applies, both, to the first sub-group of transmission bits and to the second sub-group of transmission bits.

According to yet another preferred embodiment of the present invention the first sub-group of transmission bits and the second sub-group of transmission bits are selected to achieve selective error protection.

Here, the present invention can support different bit error probabilities for transmission bits coded through the differential unitary transmit diversity coding scheme and the transmission bits coded through scaling the norm of the transmission matrix. This is of particular benefit for applications with unequal error protection, i.e. applications where different bits have different significance.

According to yet another preferred embodiment of the present invention the step of scaling the transmission matrix norm is achieved in a cyclic manner as function of the norm of a previously transmitted transmission matrix and the second subgroup of transmission bits.

Cyclic scaling is particularly suitable for coding the second sub-group of transmission bits into a norm difference of the transmission matrix. Further, cyclic scaling allows for a very efficient implementation of the scaling step with minimized computational complexity and memory requirements.

According to a second aspect of the present invention, the first object of the present invention is achieved through a method of multiple-norm differential space-time diversity reception using at least one reception antenna, having the features of claim 8;

A first advantage of the differential multiple-norm diversity reception method according to the present invention is that it may be operated in non-coherent manner and therefore does not require the knowledge of channel coefficients, channel statistics or noise variance. The reason for this is the coding of the first sub-group of transmission bits using the differential transmit diversity scheme from a unitary design which allows for determination of a decision matrix and decision variables through simple matrix computations. A further reason is that also the second sub-group of transmission bits is coded in a differential manner.

A second advantage of the second aspect of the present invention is the use of a very low number of reception matrices for decision matrix and decision variable calculation, e.g., a number of two. Therefore, output detection is achieved with low complexity and low delay. Further, time varying multiple input multiple output transmission channels have practically no impact on the output detection performance.

A third advantage of the second aspect of the present invention is that is applicable to all kinds of unitary space-time modulation schemes.

Further preferred embodiments of the present invention are related to output detection for the first subgroup of transmission bits and for the second sub-group of transmission bits. Here, the present invention supports either hard output detection or soft output detection, both, for the first sub-group of transmission bits and for the second sub-group of transmission bits, respectively. Further, the present invention also supports any hybrid form of hard output detection and soft output detection for different sub-groups of transmission bits.

An advantage of hard output detection is that it may be implemented with very low computational complexity. On the other hand, in wireless communication systems differential transmit diversity schemes are concatenated with outer forward error correction FEC codes, which concatenation is particularly supported through soft output detection mechanisms.

Further, any hybrid form of soft and hard output detection is particularity suitable for selective error rates and related applications where transmission bits for which a lower error rate is requested are handled through soft output detection and remaining transmission bits are handled through hard output detection.

According to another preferred embodiment of the present invention soft output detection relies on determination of log-likelihood ratios—either for the first subgroup of transmission bits or for the second sub-group of transmission bits. Preferably, log-likelihood ratios are calculated from max-log approximations.

As outlined above, the delivery of soft output bit decisions using log likelihood ratios significantly improves the performance of successive detection stages, e.g., an error correction decoder, compared to hard output detectors as known in the art for space-time block codes. The availability of log likelihood ratios for soft output detection is based on certain properties of the differential unitary transmit diversity scheme, i.e. related constellation matrices of the differential unitary transmit diversity scheme onto which a set of input bits from the first sub-group of transmission bits are mapped at the transmitter side have unit norm.

According to a third aspect of the present invention, the second object outlined above is achieved through a method of outer forward error correction coding in combination with a multiple-norm space-time transmit diversity modulation, comprising the steps transforming a stream of information bits into a stream of coded bits using a pre-determined basic code, doubling the stream of coded bits into a first stream of coded bits and a second stream of coded bits, puncturing the first stream of coded bits with a pre-determined puncturing pattern to generate a first sub-group of transmission bits, puncturing the second stream of coded bits with a complement of the pre-determined puncturing pattern to generate a second sub-group of transmission bits, mapping the first group sub-group of transmission bits onto a constellation matrix of a differential unitary space-time modulation scheme, determining a scaling factor from the second sub-group of transmission bits, and setting up a transmission matrix through differential encoding of the constellation matrix and a previously determined transmission matrix in combination with scaling by the scaling factor.

According to the third aspect of the present invention bits in the first sub-group of transmission bits and the second sub-group of transmission bits may have a different signal to noise ratio. According to the present invention there is proposed a channel coding and interleaving strategy which takes that difference into consideration. Data is encoded by a basic code, e.g., a rate-compatible punctured code RCPC. While usually, some code bits are punctured, i.e. not transmitted, in order to obtain a higher rate, according to the present invention the use of the puncturing pattern splits the code symbols into two streams. Since the bits which are usually punctured are less important for decoding, according to the present invention those bits are assigned to the second subgroup of transmission bits which has poorer transmission quality. The code bits in positions where the puncturing pattern is 1 go to the first sub-group of transmission bits. Optionally, interleaving can be applied to both sub-groups of transmission bits differential multiple-norm space-time modulation.

According to yet another preferred embodiment of the present invention there are provided computer programs product directly loadable into an internal memory of a differential multiple norm diversity space-time transmit diversity transmitter, an internal memory of an apparatus for outer forward error correction coding, and/or an internal memory of a differential multiple norm space-time diversity receiver comprising software code portions for performing the steps of the respective method(s) according to the present invention as outlined above when the products are run on processors of the different devices.

Therefore, the present invention is also provided to achieve an implementation of the inventive method steps on computer or processor systems. In conclusion, such implementation leads to the provision of computer program products for use with a computer system or more specifically a processor comprised, e.g., in a differential multiple norm diversity space-time transmit diversity transmitter, in an apparatus for outer forward error correction coding, and/or in a differential multiple norm space-time diversity receiver.

The programs defining the function of the present invention can be delivered to a computer/processor in many forms, including, but not limited to information permanently stored on non-writeable storage media, e.g., read only memory devices such as ROM or CD ROM discs readable by processors or computer I/O attachments; information stored on writable storage media, i.e. floppy discs and hard drives; or information convey to a computer/processor through communication media such as local area network and/or telephone networks and/or Internet or other interface devices. It should be understood, that such media when carrying processor readable instructions implementing the inventive concept represent alternate embodiments of the present invention.

DESCRIPTION OF DRAWING

In the following the best mode and preferred embodiments of the present invention will be explained with reference to the drawing in which.

DESCRIPTION OF BEST MODE AND PREFERRED EMBODIMENTS

Figure 1:
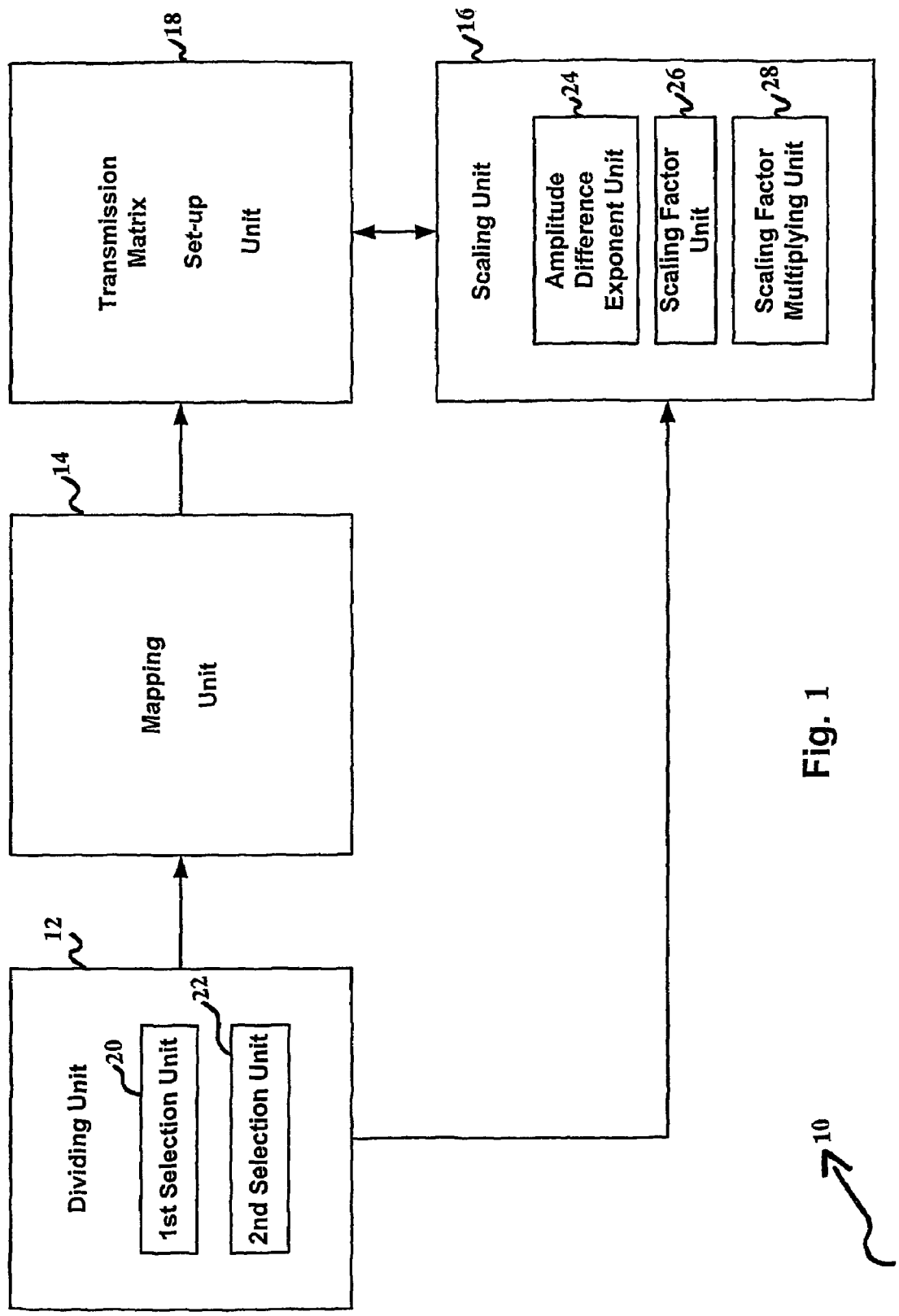
FIG. 1 shows a schematic diagram of a differential multiple-norm space-time diversity transmitter according to the present invention.

In the following, the best mode and preferred embodiments of the present invention will be explained with reference to the drawing. Initially, some basic concepts underlying differential multiple-length transmit diversity and related diversity reception will be explained for a better understanding of the present invention.

Channel Model

According to the present invention there is considered a flat fading multiple-input multiple-output MIMO channel with $n_T$ transmit and $n_R$ receive antennas. The channel coefficients are arranged in a matrix $$H_k = \begin{bmatrix} h_k^{(11)} & \cdots & h_k^{(n_T 1)} \\ \vdots & \ddots & \vdots \\ h_k^{(1 n_R)} & \cdots & h_k^{(n_T n_R)} \end{bmatrix}, \tag{1}$$

where $h_k^{(ij)}$ is the channel coefficient from transmit antenna i to receive antenna j at time k.

Further, in frequency-selective environments the flat fading channel can, e.g., be accomplished by orthogonal frequency division multiplexing OFDM with a sufficiently large guard interval. In code divisional multiple access CDMA, the signals in each finger of a Rake receiver faces a flat channel.

At the receiver, one observes $$Y_k = H_k X_k + N_k, \tag{2}$$

where $$X_k = \begin{bmatrix} x_{k,1}^{(1)} & \cdots & x_{k,L}^{(1)} \\ \vdots & \ddots & \vdots \\ x_{k,1}^{(n_T)} & \cdots & x_{k,L}^{(n_T)} \end{bmatrix} \tag{3}$$

and $$Y_k = \begin{bmatrix} y_{k,1}^{(1)} & \cdots & y_{k,L}^{(1)} \\ \vdots & \ddots & \vdots \\ y_{k,1}^{(n_R)} & \cdots & y_{k,L}^{(n_R)} \end{bmatrix} \tag{4}$$

contain the transmitted and received symbols, respectively, and $$N_k = \begin{bmatrix} n_{k,1}^{(1)} & \cdots & n_{k,L}^{(1)} \\ \vdots & \ddots & \vdots \\ n_{k,1}^{(n_R)} & \cdots & n_{k,L}^{(n_R)} \end{bmatrix} \tag{5}$$

are the noise samples which are assumed to be independent and Gaussian with variance $$\sigma^2 = \frac{N_0}{2} \tag{6}$$

per real dimension.

Principles of Differential Unitary Space-Time Modulation

Differential unitary space-time modulation was introduced simultaneously in B. Hochwald and W. Swelden, *Differential Unitary Space-Time Modulation, IEEE Transactions on Communications*, 36(4):389-400, April. 2000 and B. L. Hughes, *Differential Space-time Modulation, IEEE Transactions on Information Theory*, 46(7):2567-2578, November 2000.

According to differential unitary space-time modulation a group of $b_1 = \log_2(M_1)$ data bits $u_k^{(1)} = u_{k,1}, \ldots, u_{k,b_1}, u_{k,t} \in \{+1, -1\}$ is mapped on a L×L constellation matrix $C_k$. The $n_T$×L transmit matrix $X_k$ is determined by $C_k$ and the previously transmitted matrix $C_{k-1} = C(u_k^{(1)})$ according to the differential encoding rule $$X_k = X_{k-1} C_k. \tag{7}$$

In order to allow non-coherent detection $C_k$ must be unitary, i.e.

$$C_k C_k^H = I_L, \tag{8}$$

where $C^H$ denotes the conjugate transpose of C and $I_L$ is the L×L unity matrix. A unitary reference matrix $X_0$ has to be transmitted first. All transmit matrices $X_k$ are unitary. Substituting (7) into (2) yields $$Y_k = Y_{k-1} C_k + N_{k-1} C_k + N_k. \tag{9}$$

The equation given above describes the transmission of the info matrix $C_k$ over an equivalent channel with L transmit and $n_R$ receive antennas, channel coefficients $\hat{H}Y_{k-1}$ and—since $C_k$ is unitary—a noise variance of $\tilde{\sigma}^2 = 2\sigma^2$ per real dimension at each receive antenna.

Throughout the following description a plurality of proposals for the choice of the space-time constellation C will be considered.

A first proposal for space-time constellation matrices C relates to a differential unitary space-time modulation according to B. Hochwald and W. Swelden, *Differential Unitary Space-Time Modulation, IEEE Transactions on Communications*, 36(4):389-400, April. 2000 where the constellation matrices are diagonal matrices according to:

$$C(m) = \begin{bmatrix} e^{j2\pi d_1 m/M_1} & 0 & 0 \\ 0 & \ddots & 0 \\ 0 & 0 & e^{j2\pi d_{n_T} m/M_1} \end{bmatrix}, m = 0, \ldots, M_1 - 1. \quad (10)$$

The diagonal entries are $M_1$-PSK constellation elements which are determined by the values of $d_1$. Given the reference matrix $X_0 = I_{n_T}$, only one antenna is active at a time.

Further, for examples of constellation matrices according to the first proposal reference is made to B. Hochwald and W. Swelden, *Differential Unitary Space-Time Modulation, IEEE Transactions on Communications*, 36(4):389-400, April. 2000, incorporated herein by reference.

A second proposal for space-time constellation matrices C relates to differential space-time modulation according to B. L. Hughes, *Differential Space-time Modulation, IEEE Transactions on Information Theory*, 46(7):2567-2578, November 2000.

According to the second proposal space-time constellation matrices C are determined by the group consisting of all distinct products of powers of certain matrices $G_1, \ldots, G_m$. Due to the group property, the transmit matrices $X_k$ are also elements of the group. The symbols transmitted from each antenna are again PSK constellation elements. For $n_T = 2$ transmit antennas, the reference matrix is given by $$X_0 = \frac{1}{\sqrt{2}} \begin{bmatrix} 1 & -1 \\ 1 & 1 \end{bmatrix} \quad (11)$$

For further examples of constellation matrices according to the second proposal reference is made to B. L. Hughes, *Differential Space-time Modulation, IEEE Transactions on Information Theory*, 46(7):2567-2578, November 2000, incorporated herein by reference.

A third proposal for space-time constellation matrices C relates to orthogonal designs. Orthogonal designs for coherent space-time block codes are given for V. Tarokh, H. Jafarkhani, and A. R. Calderbank, *Space-Time Block Codes from Orthogonal Designs, IEEE Transactions on Information Theory*, 45(5): 1456-1467, June 1999 and O. Tirkkonen and A. Hottinen, *Complex Space-Time Block Codes for four TX antennas, GLOBECOM*, pp. 1005-1009, IEEE, November/December 2000 and defined to matrices with orthogonal columns.

In more detail, unitary constellation matrices $C_k$ can be obtained from orthogonal designs with PSK symbols $c_{k,l}$, $l=1, \ldots, K$. For $n_T=2$, $K=2$ and $n_T=4$, $K=3$, orthogonal designs are given by S. Alamouti, *A Simple Transmitter Diversity Technique for Wireless Communications, IEEE Journal on Selected Areas of Communications, Special Issue on Signal Processing for Wireless Communications*, 16(8):1451-1458, 1998 and O. Tirkkonen and A. Hottinen, *Complex Space-Time Block Codes for four TX antennas, GLOBE-COM*, pp. 1005-1009, IEEE, November/December 2000, incorporated herein by reference, according to $$C_k = \begin{bmatrix} c_{k,1} & c_{k,2} \\ -c_{k,2}^* & c_{k,1}^* \end{bmatrix}, C_k = \begin{bmatrix} c_{k,1} & c_{k,2} & c_{k,3} & 0 \\ -c_{k,2}^* & c_{k,1}^* & 0 & c_{k,3} \\ c_{k,3}^* & 0 & -c_{k,1}^* & c_{k,2} \\ 0 & c_{k,3}^* & -c_{k,2}^* & -c_{k,1} \end{bmatrix}. \quad (12)$$

Further, the reference matrix can be chosen as an orthogonal design with arbitrary PSK symbols. The orthogonality allows for a low-complexity receiver. However, it should be noted that the transmitted symbols after differential encoding are no PSK constellation elements any more, i.e. the constellation is expanded.

A fourth proposal for space-time constellation matrices C relates to unitary space-time modulation with PSK-Symbols which is a more bandwidth-efficient proposal for unitary space-time modulation and explained in A. Steiner, M. Peleg, and S. Shamai, *Iterative Decoding of Space-Time Differentially Coded Unitary Matrix Modulation IEEE Transaction on Signal Processing*, 50(10):2385-2395, October. 2002, incorporated herein by reference.

E.g., for L=2 info bits may be mapped on three PSK symbols $C_{k,1}, \ldots, c_{k,3}$ and the remaining entry of the constellation matrix $C_k$ may be determined such that $C_k$ becomes unitary, i.e.

$$C_k = \begin{bmatrix} c_{k,1} & c_{k,2} \\ c_{k,3} & -\frac{c_{k,1}^* c_{k,3}}{c_{k,2}^*} \end{bmatrix}. \quad (13)$$

As outlined above with respect to orthogonal designs, also for unitary space-time modulation with PSK-symbols constellations of transmit symbols will be expanded. Further, this scheme allows for higher bandwidth efficiency compared to orthogonal designs it leads to a more complex receiver.

In view of the explanations given above, in the following different aspects and preferred embodiments of differential multiple-norm diversity transmission according to the present invention will be explained with reference to the drawing. It should be noted that any structure and functionality as described in the following may be either implemented in hardware or software, and/or any combination thereof.

Differential Multiple-Norm Transmit Diversity

A straight forward approach to higher bandwidth-efficiency, would be to transmit more bits per constellation matrix, i.e. to increase the cardinality $M_1$ of the unitary space-time modulation constellation. However, the receiver complexity will increase exponentially with the number of bits per matrix. Further, as described above, constellation matrices are derived from PSK symbols. Since the distance properties of M-PSK are only advantageous for $M \leq 8$, a poor performance for higher order constellation matrices is to be expected.

Therefore, for higher order modulation it is better to code the information in phase and amplitude. For single transmit antenna systems, differential amplitude and phase shift keying DAPSK has been proposed, e.g., in H. Rohling and V.

Engels, *Differential Amplitude Phase Shift Keying (DAPSK)—A New Modulation Method for DTVB*, International Broadcasting Convention, pp. 102-108, 1995 and F. Adachi and M. Sawahashi, *Decision Feedback Differential Detection of Differentially Encoded 16APSK Signals*, IEEE Transactions on Communications, 44, April 1996, 416-418.

Further, differential space-time modulation with APSK signals are proposed in X.-G. Xia, *Differentially En/decoded Orthogonal Space-Time Block Codes with APSK Signals*, IEEE Communications Letters, 6(4):150-152, April. 2002 as an extension of unitary space-time modulation, B. Hochwald and W. Swelden, *Differential Unitary Space-Time Modulation*, IEEE Transactions on Communications, 36(4):389-400, April 2000 and B. L. Hughes, *Differential Space-time Modulation*, IEEE Transactions on Information Theory, 46(7): 2567-2578, November 2000. Here, transmission symbols which are input to the differential space-time modulator are taken from an APSK constellation, i.e. concentric PSK constellations with different amplitude.

Contrary to the above, according to a first aspect of the present invention there is proposed a more general approach of differential multiple-norm diversity transmission which can be applied as an extension of any differential unitary space-time modulation scheme.

FIG. 1 shows a schematic diagram of a differential multiple-norm space-time diversity transmitter according to the present invention.

As shown in FIG. 1, the differential multiple-norm space-time diversity transmitter 10 according to the present invention comprises a dividing unit 12, a mapping unit 14, a scaling unit 16, and a transmission matrix set-up unit 18. Further, the dividing unit 12 comprises a first selection unit 20 and a second selection unit 22. Still further, the scaling unit 16 comprises an amplitude difference exponent unit 24, a scaling factor unit 26, and -optionally a scaling factor multiplying unit 28.

Figure 2:
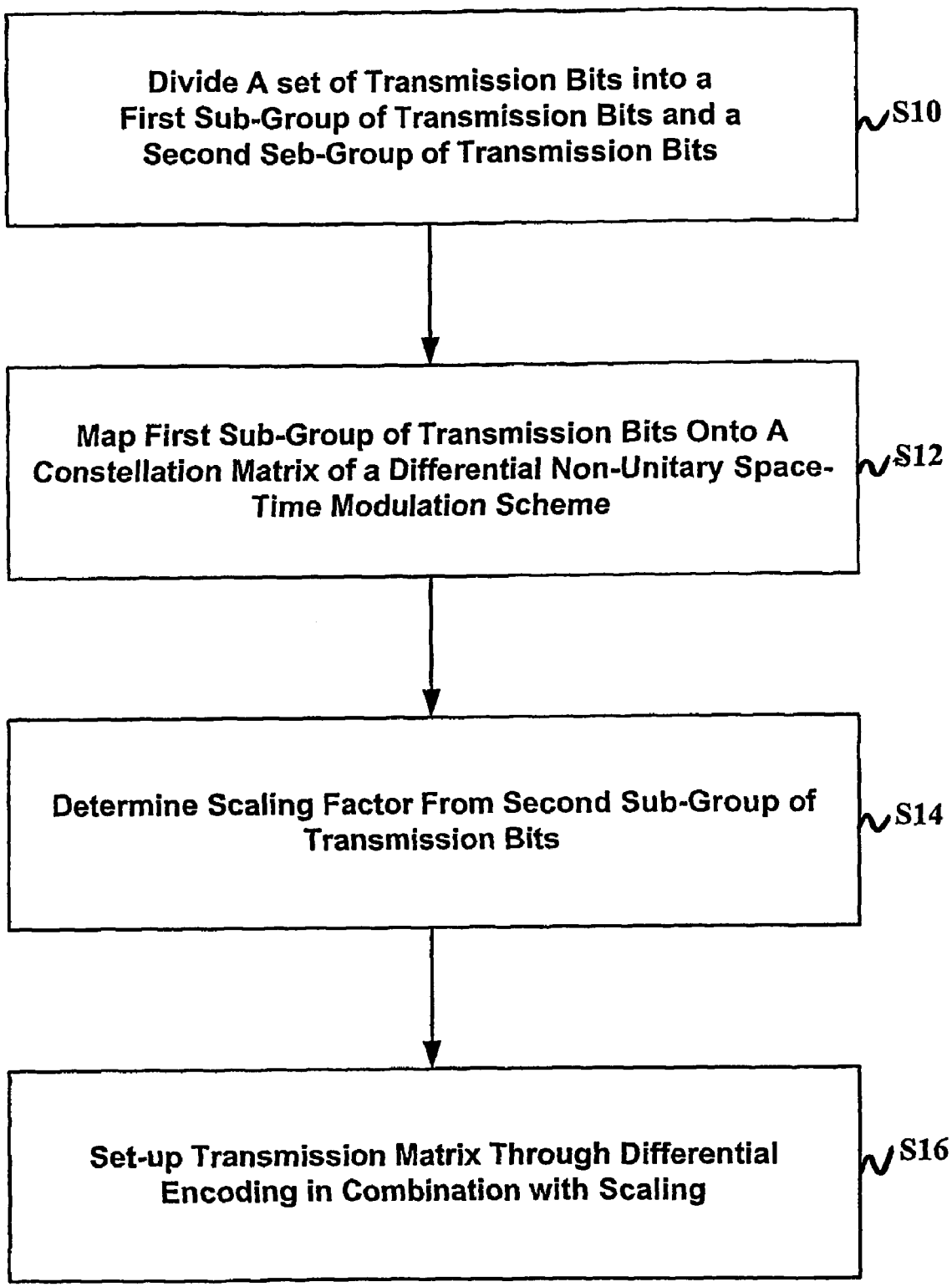
FIG. 2 shows a flowchart of operation of the differential multiple-norm space-time diversity transmitter shown in FIG. 1.

FIG. 2 shows a flowchart of operation of the differential multiple-norm space-time diversity transmitter shown in FIG. 1.

As shown in FIG. 2, the method of achieving differential multiple-norm space-time transmit diversity from a unitary space-time modulation scheme using at least two transmit antennas comprises a first step S10 of dividing a group of transmission bits into a first sub-group of transmission bits and a second sub-group of transmission bits. Step S10 is operatively achieved by the dividing unit 12.

As shown in FIG. 2, a further step S12 is related to mapping of the first group sub-group of transmission bits onto a constellation matrix of a differential unitary space-time modulation scheme. This step S12 is achieved by the mapping unit 14.

As shown in FIG. 2, in a subsequent step S14 there is determined a scaling factor from the second subgroup of transmission bits through the scaling unit 16.

As shown in FIG. 2, finally in a step S16 executed by the transmission matrix set-up unit 18 a transmission matrix is set-up through differential encoding of the constellation matrix and a previously determined transmission matrix in combination with scaling by the scaling factor.

Further and in more detail, it is assumed that the group of transmission bits comprises $\log_2(M_1)+\log_2(M_2)$ bits, wherein $M_1$ is the number of possible bit sequences of the first sub-group of transmission bits and $M_2$ is the number of possible norm values of the transmission matrix.

In more detail, the step S10 of dividing the group of transmission bits is achieved by sub-units of the dividing unit 12, i.e. the first selection unit 20 adapted to select a number of $b_1=\log_2(M_1)$ bits in the group of transmission bits for the first sub-group of transmission bits $u_k^{(1)}=[u_{k,1},\ldots,u_{k,b_1}]^T$ and the second selection unit 22 adapted to select a number of $b_2=\log_2(M_2)$ bits in the group of transmission bits for the second subgroup of transmission bits $u_k^{(2)}=[u_{k,b_1+1},\ldots,u_{k,b_1+b_2}]^T$.

Figure 3:
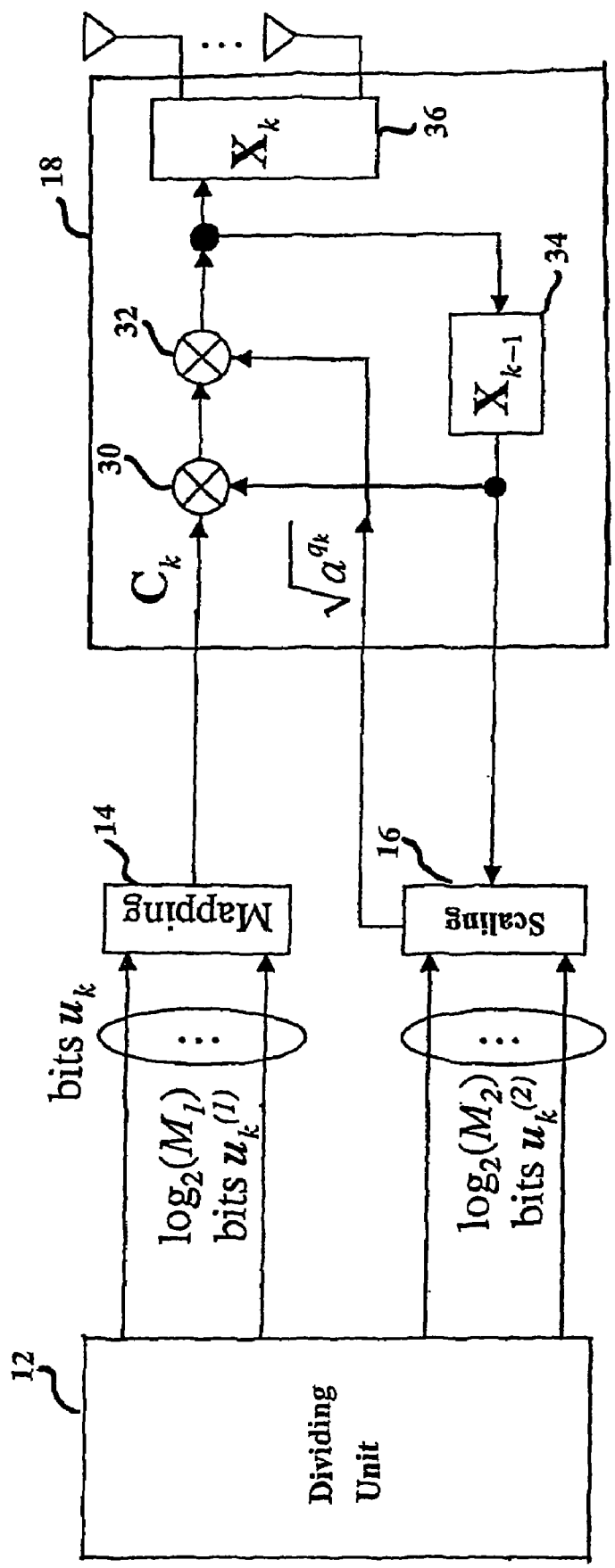
FIG. 3 shows a further detailed schematic diagram of the differential multiple-norm space-time diversity transmitter shown in FIG. 1.

FIG. 3 shows a further detailed schematic diagram of the differential multiple-norm space-time diversity transmitter shown in FIG. 1.

As shown in FIG. 3, the transmission matrix set-up unit 18 comprises a differential coding unit 30, a scaling factor multiplying unit 32, a delay unit 34, and a memory unit 34. It should be noted, that while FIG. 3 shows the output of the differential coding unit 30 connected to the scaling factor multiplying unit 32, the scaling factor multiplying unit 32 may as well be connected between the output of the delay unit 34 and the differential coding unit 30. Optimally and as shown in FIG. 1, the scaling factor multiplying unit 32 may also form part of the scaling unit 16.

Operatively, the differential coding unit 30 is adapted to encode the constellation matrix and a previously determined transmission matrix according to $$X_k = X_{k-1} C_k. \tag{14}$$

wherein $X_k$ is the transmission matrix, $X_{k-1}$ is the previously transmitted transmission matrix, $C_k$ a constellation matrix of a differential unitary space-time modulation scheme, and k is a time index.

Further, operatively the scaling factor multiplying unit 32 is adapted to scale the result of differential encoding of the constellation matrix and a previously determined transmission matrix with a scaling factor according to $$X_k = \sqrt{a^{q_k}} X_{k-1} C_k. \tag{15}$$

Further, operatively the delay unit 34 is adapted to delay a transmission matrix $X_{k-1}$ for set-up of a transmission matrix $X_k$ in a subsequent point in time of transmission. Still further, operatively the memory unit 36 is adapted to store a transmission matrix $X_k$ for a related transmission.

Figure 4:
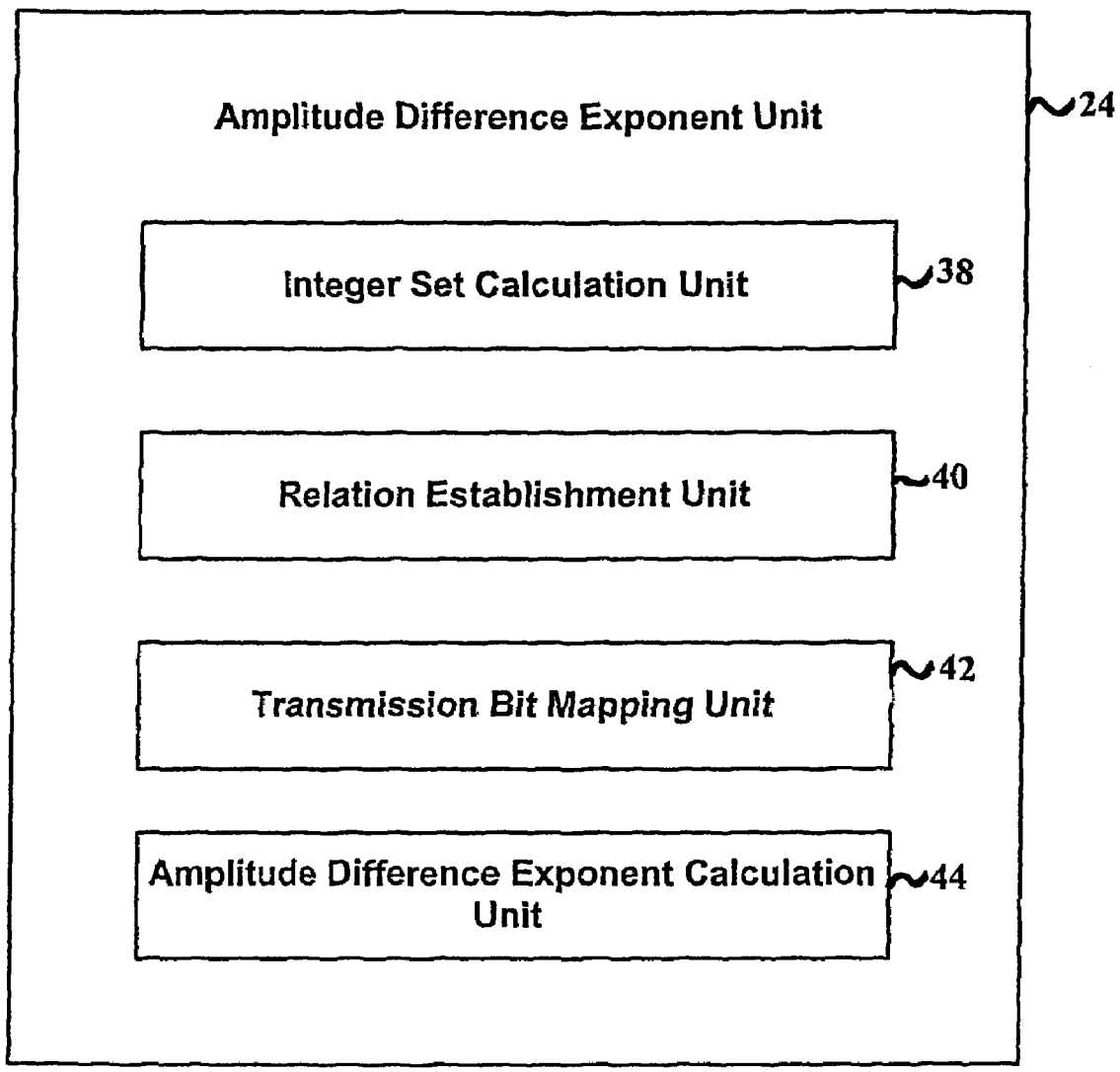
FIG. 4 shows a schematic diagram of the amplitude difference exponent unit shown in FIG. 1.

FIG. 4 shows a schematic diagram of the amplitude difference exponent unit shown in FIG. 1.

As shown in FIG. 4, the amplitude difference exponent unit 24 comprises an integer set calculation unit 38, a relation establishment unit 40, a transmission bit mapping unit 42, and au amplitude difference exponent calculation unit 44.

Figure 5:
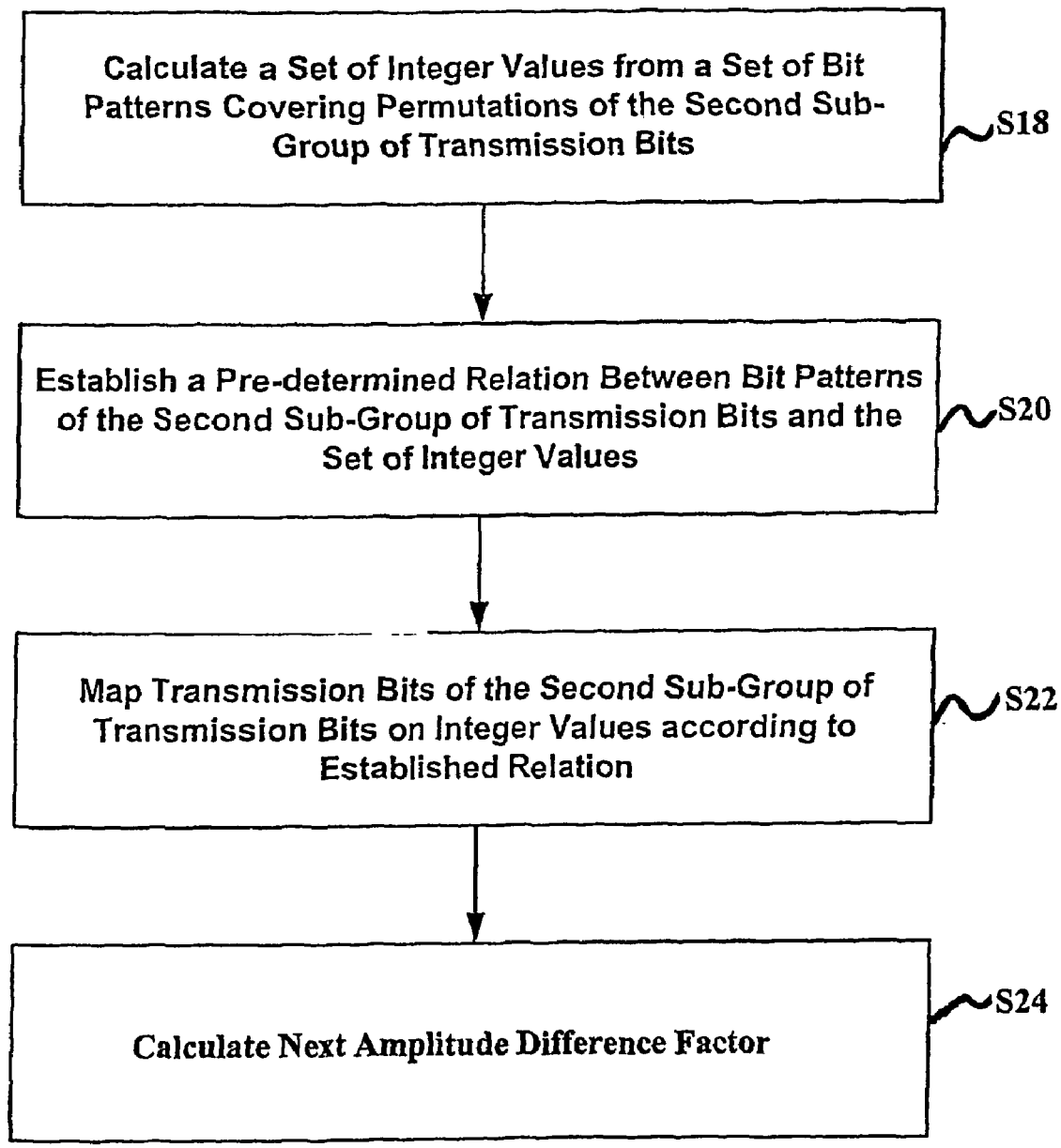
FIG. 5 shows a flowchart of operation of the amplitude difference exponent unit shown in FIG. 4.

FIG. 5 shows a flowchart of operation of the amplitude difference exponent unit shown in FIG. 4.

As shown in FIG. 5, operatively in a step S18 the integer set calculation unit 38 calculates a set of integer values from a set of bit patterns covering permutations of the second group of transmission bits.

E.g., the integer set calculation unit 38 calculates a set of $M_2$ integer values $d_k \in \{0_1 \ldots, M_2\}$ from a set of bit patterns $[p_1, \ldots, p_{log_2(M_2)}]$ covering permutations of the second subgroup of transmission bits for all $p_i \in \{0,1\}$ according to:

$$d_k = \sum_{i=1}^{i=\log_2(M_2)} [p_i \cdot 2^i] \tag{16}$$

As shown in FIG. 5, operatively in a step S20 the relation establishment unit 40 generates a relation between bit patterns of the second subgroup of transmission bits and the set of integer values.

As shown in FIG. 5, operatively in a step S22 the transmission bit mapping unit 42 achieves a mapping of the second sub-group of transmission bits on integer values according to the generated relation. Table 1 gives an example for Gray mapping of input bits to the amplitude difference exponent $q_k$ for $M_2=4$.

TABLE 1

Amplitude difference exponent $q_k$ for $M_2 = 4$ and Gray mapping.

| $z_{k-1}$ | $\|X_{k-1}X^H_{k-1}\|_1$ | $u_{k\_b1+1}, u_{k\_b1+2} \mid d_k$ | | | |
|---|---|---|---|---|---|
| | | 00\|0 | 01\|1 | 11\|2 | 10\|3 |
| 0 | 1 | 0 | 1 | 2 | 3 |
| 1 | a | 0 | 1 | 2 | −1 |
| 2 | $a^2$ | 0 | 1 | −2 | −1 |
| 3 | $a^3$ | 0 | −3 | −2 | −1 |

As shown in FIG. 5, operatively in a step S24 the amplitude difference exponent unit 44 calculates a scaling factor, e.g., according to $\sqrt{a^{q_k}}$, wherein a is a pre-determined constant.

Using the square-root is non-binding for the scope of the present invention, nevertheless convenient for the description of the receiver. Depending on the $b_2$ last input bits, the amplitude $a^{z_k}$ is cyclically increased compared to the previously transmitted matrix by a factor of $1, a, a^2, \ldots$, or $a^{M_2-1}$. In general, the amplitude exponent is given by $$q_k = z_{k-1} - M_2 \lfloor (z_{k-1} + d_k)/M_2 \rfloor, \quad (17)$$

where $\lfloor \cdot \rfloor$ is the floor function. The input bits $u_k^{(2)}$ are mapped on an integer $d_k \in \{0, 1, \ldots, M_2-1\}$ (see Table 1 for an example) and $z_{k-1}$ denotes the amplitude exponent of the previously transmitted matrix $X_{k-1}$ which is determined by $$z_k = z_{k-1} + q_{k-1} \quad (18)$$

with the arbitrary choice $z_0 = q_0 = 0$.

In view of the above, transmission matrices are no longer unitary any more but satisfy $$X_k X_k^H = a^{z_k} I_{n_T}, \quad (19)$$

where $a^z$ can take the discrete real values $a^z \in \{1, a, a^2, \ldots, a^{M_2-1}\}$.

Differential Multiple-Norm Diversity Reception

In the following different aspects and preferred embodiments of differential multiple-norm diversity reception according to the present invention will be explained. Heretofore, it is assumed that multiple-norm space-time modulated transmission matrices are set up at the transmitter side through differential space-time modulation from a unitary space-time modulation scheme for transmission of a first sub-group of transmission bits and further through multinorm scaling of the differential space-time modulation result for transmission of a second group of transmission bits, as outlined above with respect to FIG. 1 to FIG. 5.

For the differential multiple-norm diversity reception method and apparatus as described in this section it may be assumed, without binding effect on scope of the present invention, that two successive reception matrices are considered for diversity reception:

$$Y_{k-1} = H_{k-1} X_{k-1} + N_{k-1} \quad (20)$$

$$Y_k = H_k X_k + N_k = \sqrt{a^{q_k}} H_k X_{k-1} C_k + N_k, \quad (21)$$

Here, without binding effect on the scope of the present invention, the channel is assumed to be constant during transmission of two matrices, i.e.

$$H_{k-1} = H_k. \quad (22)$$

Substituting (20) into (21) yields $$Y_k = \sqrt{a^{q_k}} Y_{k-1} C_k - \sqrt{a^{q_k}} N_{k-1} C_k + N_k \quad (23)$$
$$= \sqrt{a^{q_k}} Y_{k-1} C_k + \tilde{N}_k.$$

The equations given above describe the transmission of the constellation matrix $C_k$ over an equivalent channel with L transmit and $n_R$ receive antennas, channel coefficients $\tilde{H} = \sqrt{a^{q_k}} Y_{k-1}$ and—since $C_k$ is unitary—additive white Gaussian noise with variance per real dimension at each receive antenna:

$$\tilde{\sigma}^2 = \sigma^2 (a^{q_k} + 1) \quad (24)$$

Before explaining detail of diversity reception according to the present invention it should be noted that non-coherent detection of the sets $u_k^{(1)}$ and $u_k^{(2)}$ can be completely separated.

Figure 6:
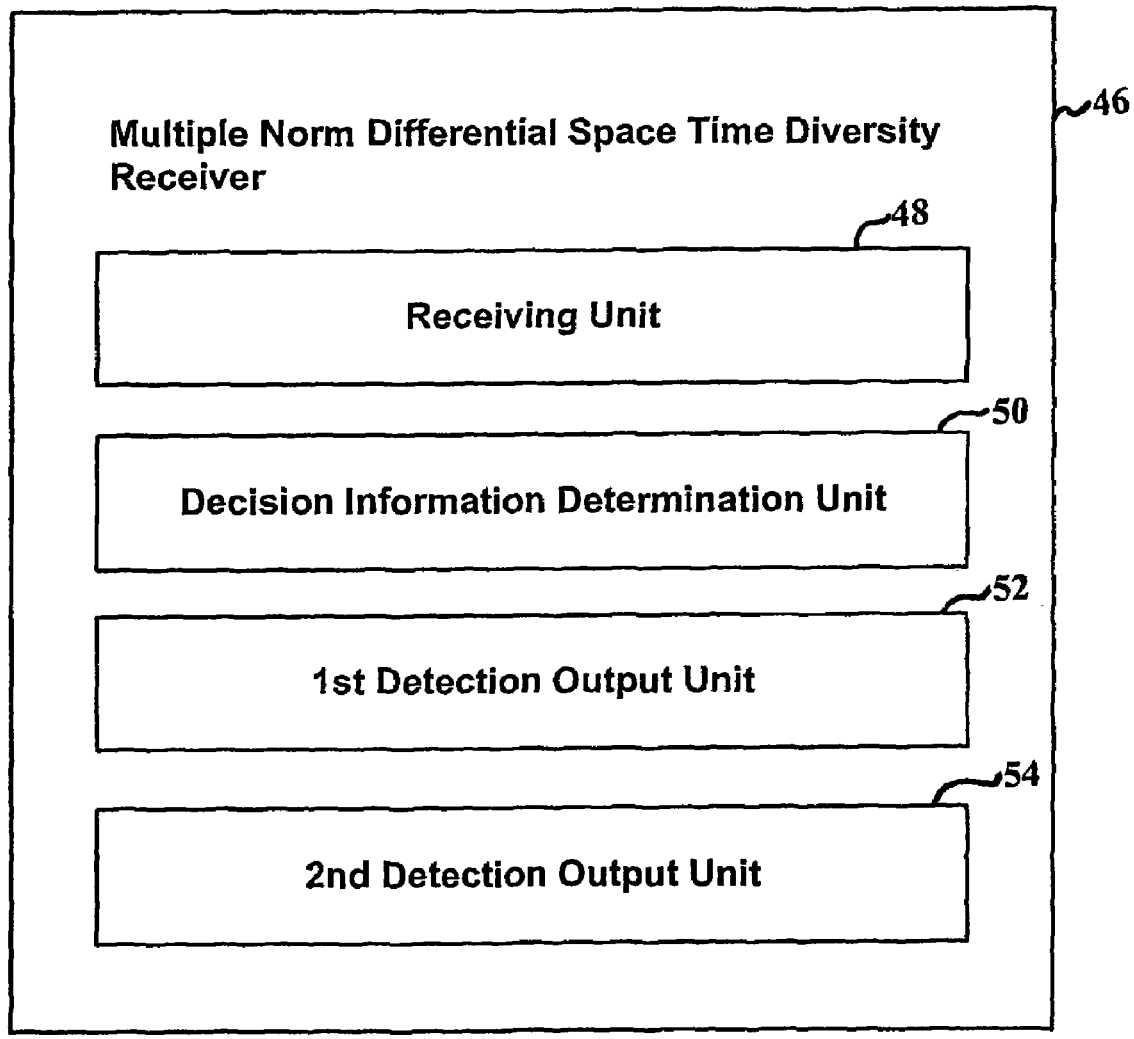
FIG. 6 shows a schematic diagram of a multiple-norm differential space-time diversity receiver according to the present invention.

FIG. 6 shows a schematic diagram of a multiple-norm differential space-time diversity receiver according to the present invention.

As shown in FIG. 6, the multiple-norm differential space-time diversity receiver 46 comprises a receiving unit 48, a decision information determination unit 50, a first detection output unit 52 and a second detection output unit 54.

Figure 7:
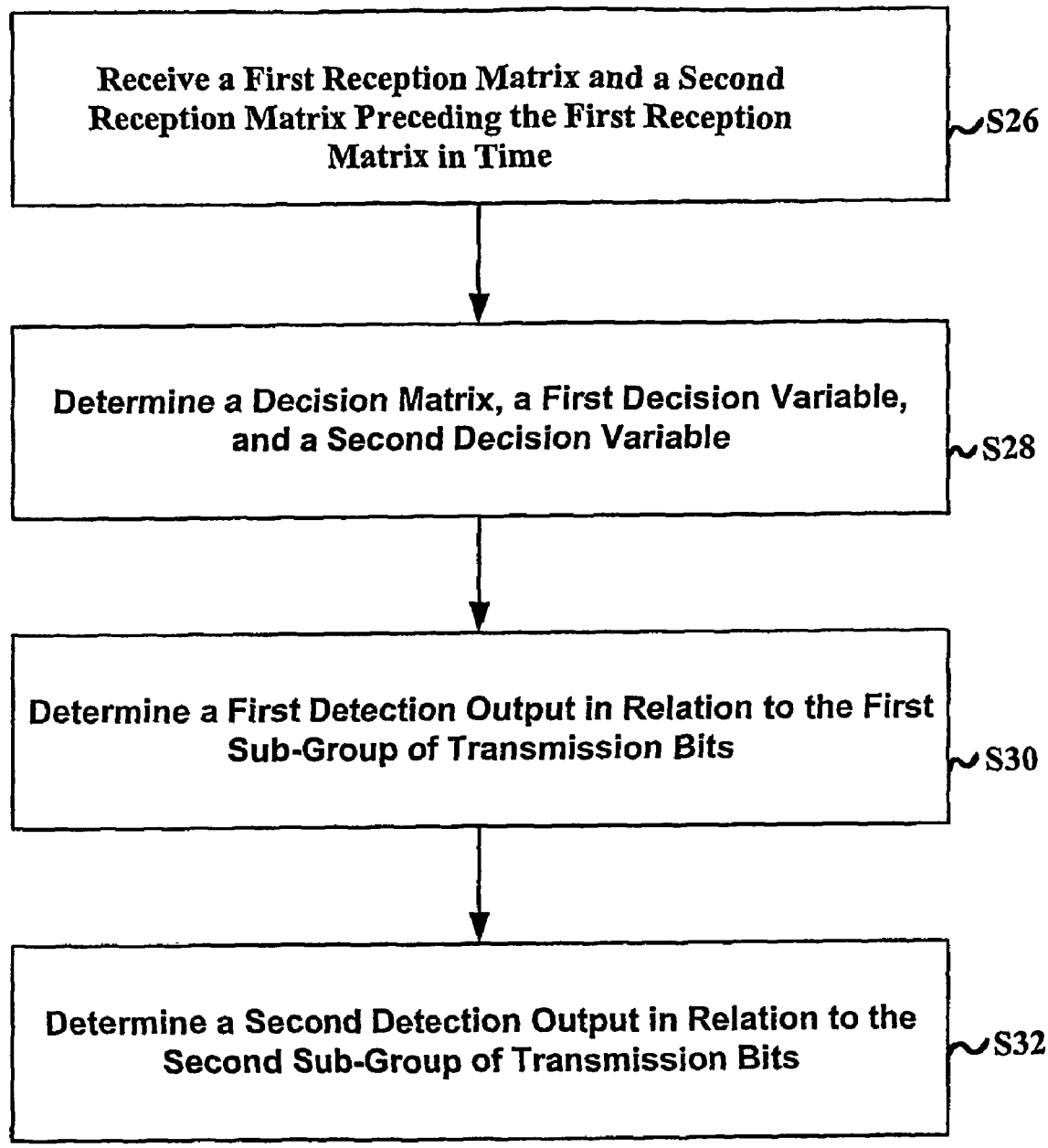
FIG. 7 shows a flowchart of operation of the multiple-norm differential space-time diversity receiver shown in FIG. 6.

FIG. 7 shows a flowchart of operation of the multiple-norm differential space-time diversity receiver shown in FIG. 6.

As shown in FIG. 7, in a step S26 operatively the receiving unit 48 receives a first reception matrix and a second reception matrix preceding the first reception matrix in time.

As shown in FIG. 7, in a step S28 operatively the decision information determination unit 50 determines a decision matrix, a first decision variable, and a second decision variable through execution of matrix operations on the first reception matrix and the second reception matrix.

As shown in FIG. 7, in a step S30 operatively the first detection output unit 52 determines a first detection output in relation to the first sub-group of transmission bits on the basis of the decision matrix and the first decision variable.

As shown in FIG. 7, in a step S32 operatively the second detection output unit 54 determines a second detection output in relation to the second sub-group of transmission bits on the basis of the decision matrix and the first decision variable and the second decision variable.

Figure 8:
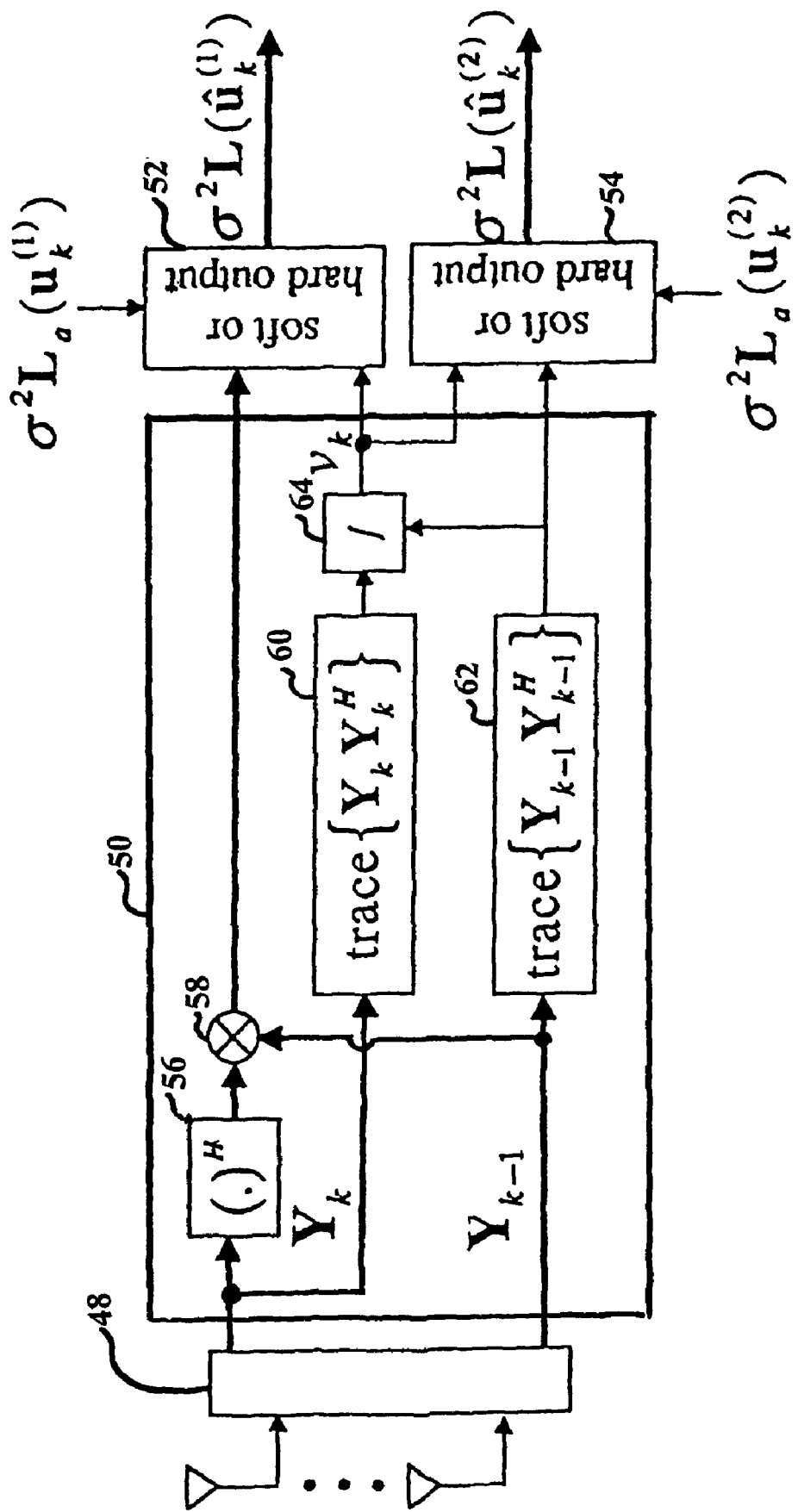
FIG. 8 shows a further detailed schematic diagram of a multiple-norm differential space-time diversity receiver shown in FIG. 6.

FIG. 8 shows a further detailed schematic diagram of a multiple-norm differential space-time diversity receiver shown in FIG. 6, in particular further details of the decision information determination unit 50.

As shown in FIG. 8, the decision determination unit 50 comprises a first matrix operation unit 56, 58 adapted to combine the first reception matrix and the second reception matrix through a first matrix operation for determination of the decision matrix in relation to the first subgroup of transmission bits.

In particular, the first matrix operation unit 56, 58 is adapted to determine the decision matrix according to $$D_k = Y_k^H \cdot Y_{k-1} \quad (25)$$

wherein $D_k$ is the decision matrix, $Y_k$ is the first reception matrix, $Y_{k-1}$ is the second reception matrix, and H is the Hermetian operator.

As shown in FIG. 8, the decision determination unit 50 comprises a second matrix operation unit 60, 62, 64 adapted to combine the first reception matrix and the second reception matrix through a second matrix operation for determination of a first decision variable in relation to the first subgroup of transmission bits and the second sub-group of transmission bits.

In particular, the second matrix operation unit 60, 62, 64 is adapted to determine the first decision variable $v_k$ according to $$v_k = \frac{\text{trace}\{Y_k Y_k^H\}}{\text{trace}\{Y_{k-1} Y_{k-1}^H\}} \quad (26)$$

wherein $Y_k$ is the first reception matrix, $Y_{k-1}$ is the second reception matrix, H is the Hermetian operator; and trace is the trace operator delivering the sum over the diagonal elements of a matrix.

As shown in FIG. 8, the decision determination unit 50 comprises a third matrix operation unit 62 adapted to process the second reception matrix through a third matrix operation for determination of a second decision variable in relation the second subgroup of transmission bits.

In particular, the third matrix operation unit 62 is adapted to determine the second decision variable is determined according to $$\text{trace}\{Y_{k-1} Y_{k-1}^H\} \quad (27)$$

wherein $Y_{k-1}$ is the second reception matrix.

Further preferred embodiments of the present invention are related to output detection for the first subgroup of transmission bits and for the second sub-group of transmission bits on the basis of the decision matrix, the first decision variable and the second decision variable, respectively. Here, the present invention supports either hard output detection or soft output detection, both, for the first sub-group of transmission bits and for the second sub-group of transmission bits, respectively. Further, the present invention also supports any hybrid form of hard output detection and soft output detection for different sub-groups of transmission bits.

First Sub-Group of Transmission Bits—Hard Output Detection

Figure 9:
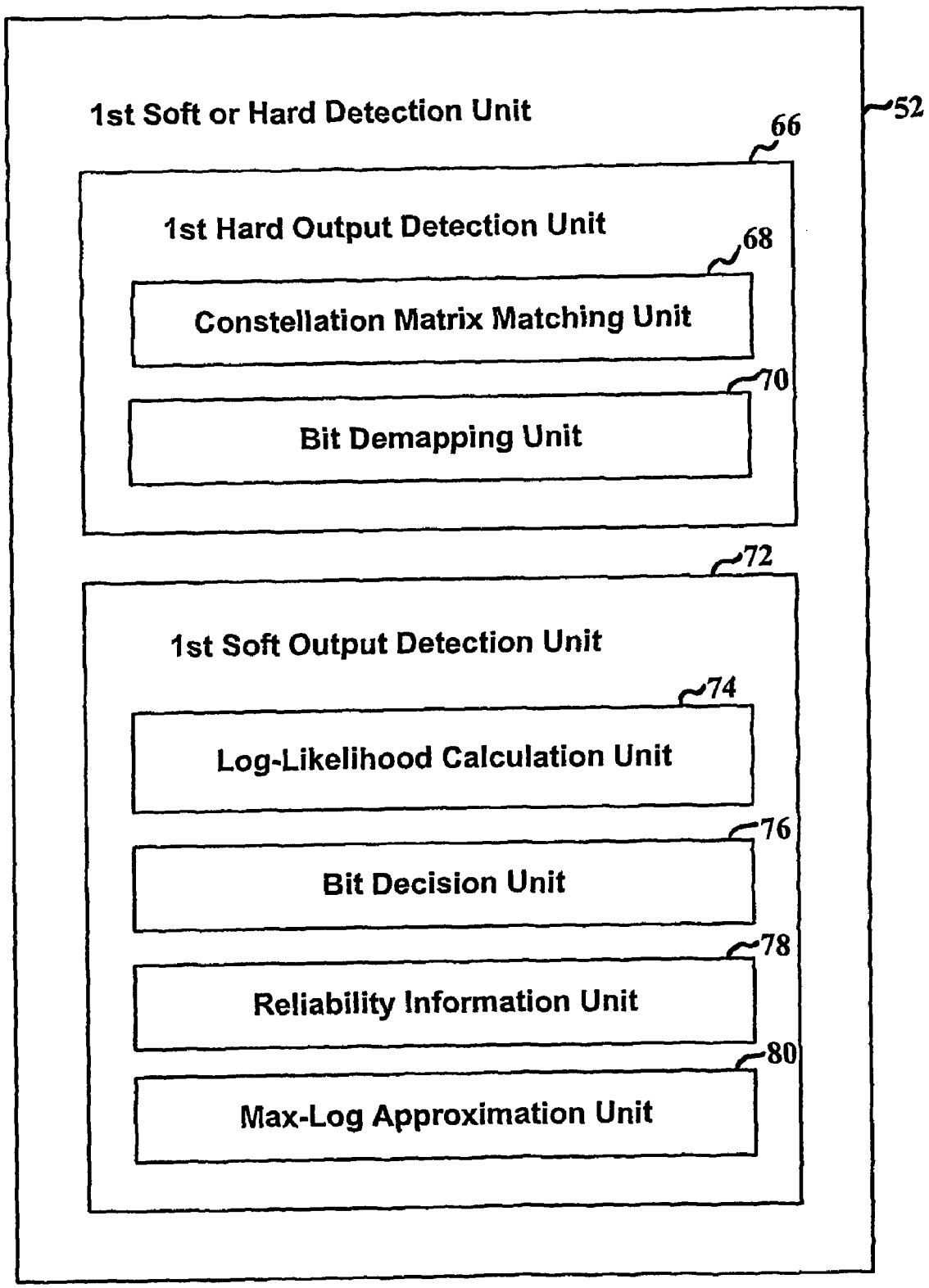
FIG. 9 shows a schematic diagram of the first soft or hard detection output unit shown in FIG. 6 or 8.

FIG. 9 shows a schematic diagram of the first output detection unit 52 shown in FIG. 6 or 8.

As shown in FIG. 9, the first output detection unit 52 comprises a first hard output detection unit 66 with a first constellation matrix matching unit 68 and a first bit demapping unit 70.

Operatively the first constellation matrix matching unit 68 determines the first detection output according to $$\hat{C}_k = \arg\min_{C_k} \{\|Y_k - \sqrt{a^{q_k}} Y_{k-1} C_k\|^2\} \quad (28)$$
$$= \arg\max_{C_k} \{\text{trace}\{\text{Re}\{C_k Y_k^H Y_{k-1}\}\}\}$$

wherein $\hat{C}_k$ is the first detection output, $\arg\min_{C_k}$ is an operator identifying a constellation matrix $C_k$ minimizing the operand, and $\arg\max_{C_k}$ is an operator identifying a constellation matrix $C_k$ maximizing the operand.

Further, operatively the first bit demapping unit 70 obtains a first detection output $u_k^{(1)}$ by demapping from $\hat{C}_k$.

First Sub-Group of Transmission Bits—Soft Output Detection

As shown in FIG. 9, the first output detection unit 52 comprises a first soft output detection unit 72 with a log-likelihood calculation unit 74, a bit decision unit 76, a reliability information unit 78, and a max-log approximation unit 80.

Operatively, the a posteriori probability APP log-likelihood determination unit 74 is adapted to determine log-likelihood ratios for the first sub-group of transmission bits according to $$L^{(1)}(\hat{u}_{k,t}) = \log \frac{(p(u_{k,t}) = +1 | Y_{k-1}, Y_k)}{(p(u_{k,t}) = -1 | Y_{k-1}, Y_k)} \quad (29)$$

$$= \log \frac{\sum\limits_{\substack{C_k \\ u_{k,t}=+1}} p(C_k | Y_k Y_{k-1})}{\sum\limits_{\substack{C_k \\ u_{k,t}=-1}} p(C_k | Y_k Y_{k-1})}$$

wherein k is a time index, $u_k$ corresponds to the first sub-group of transmission bits and $U_{k,t}$ is a transmission bit at position l in $u_k$, $p(u_{k,t}=+1|Y_k, Y_{k-1})$ is a conditional probability for $u_{k,t}=+1$ in view of the first reception matrix $Y_k$ and the second reception matrix $Y_{k-1}$, $p(u_{k,t}=-1|Y_k, Y_{k-1})$ is a conditional probability for $u_{k,t}=-1$ in view of the first reception matrix $Y_k$ and the second reception matrix $Y_{k-1}$, and $p(C_k|Y_k, Y_{k-1})$ is a conditional probability for transmission of the first subgroup of transmission bits through mapping onto constellation matrix $C_k$ at the transmitter side in view of the first reception matrix $Y_k$ and the second reception matrix $Y_{k-1}$; and the sum in the nominator is taken over all constellation matrices $C_k$ which are associated with $u_{k,t}=+1$ and the sum in the denominator is taken over all constellation matrices $C_k$ associated with $u_{k,t}=-1$.

Further, operatively the bit decision unit 76 is adapted to determine a bit decision for the first subgroup of transmission bits according to $$\hat{u}_{k,t} = \text{sign}(L^{(1)}(\hat{u}_{k,t})) \quad (30)$$

Further, operatively the reliability information unit 78 is adapted to determine a reliability information for the first subgroup of transmission bits according to $$|L^{(1)}(\hat{u}_{k,t})|. \quad (31)$$

In more detail, for a soft-output detection according to the present invention it is proposed use max-log approximation of APP log-likelihood values, which approximations are operatively determined through the max-log approximation unit 80 shown in FIG. 9.

For approximation of log-likelihood values according to the present invention it is proposed to use (23) and (24) in order to compute the logarithmic probability $$\log p(C_k | Y_k Y_{k-1}) = \quad (32)$$

$$const + \frac{2\sqrt{a^{q_k}}}{2\tilde{\sigma}^2} \text{trace}\{\text{Re}\{C_k Y_k^H Y_{k-1}\}\} + \frac{1}{2} u_k^{(1)T} L_a(u_k^{(1)}) =$$

-continued $$const + \frac{\sqrt{a^{q_k}}}{\sigma^2(a^{q_k}+1)} \text{trace}\{\text{Re}\{C_k Y_k^H Y_{k-1}\}\} + \frac{1}{2} u_k^{(1)T} L_a(u_k^{(1)}),$$

where $$L_a^{(1)}(u_k^{(1)}) = [L_a(u_{k,1}), \ldots, L_a(u_{k,b_1})]^T$$

is a vector containing the bit a priori information $$L_a^{(1)}(u_{k,t}) = \log \frac{(P(u_{k,t}) = +1)}{(P(u_{k,t}) = -1)}. \quad (33)$$

If no a priori information is available, then $L_a(u_k^{(1)})=0$. Using (32) and the max-log approximation $\ln[e^{\delta_1}+e^{\delta_2}] \approx \max\{\delta_1, \delta_2\}$ one obtains for all bits $t=1, \ldots, b_1$ in the first subgroup of transmission bits $$L^{(1)}(\hat{u}_{k,t}) \approx \quad (34)$$

$$\max_{\substack{C_k \\ u_{k,t}=+1}} \left\{ \frac{\sqrt{a^{q_k}}}{\sigma^2(a^{q_k}+1)} \text{trace}\{\text{Re}\{C_k Y_k^H Y_{k-1}\}\} + \frac{1}{2} u_k^{(1)T} L_a(u_k^{(1)}) \right\} -$$

$$\max_{\substack{C_k \\ u_{k,t}=-1}} \left\{ \frac{\sqrt{a^{q_k}}}{\sigma^2(a^{q_k}+1)} \text{trace}\{\text{Re}\{C_k Y_k^H Y_{k-1}\}\} + \frac{1}{2} u_k^{(1)T} L_a(u_k^{(1)}) \right\}$$

Equation (34) still requires knowledge of $a^{q_k}$ and of the noise variance $\sigma^2$. Given the definition (41), one may approximate $$a^{q_k} \approx |v_k|, \quad (35)$$

which is valid for reasonably high signal to noise ratios SNR. In order to avoid estimation of the noise variance, one may simply multiply (34) by $\sigma^2$ and calculate an approximation in the max-log approximation unit 80 according to $$\sigma^2 L^{(1)}(\hat{u}_{k,t}) \approx \quad (36)$$

$$\max_{\substack{C_k \\ u_{k,t}=+1}} \left\{ \frac{\sqrt{|v_k|}}{|u_k|+1} \text{trace } \{\text{Re}\{C_k Y_k^H Y_{k-1}\}\} + \frac{\sigma^2}{2} u_k^{(1)T} L_a(u_k^{(1)}) \right\}$$

$$- \max_{\substack{C_k \\ u_{k,t}=-1}} \left\{ \frac{\sqrt{|v_k|}}{|v_k|+1} \text{trace } \{\text{Re}\{C_k Y_k^H Y_{k-1}\}\} + \frac{\sigma^2}{2} u_k^{(1)T} L_a(u_k^{(1)}) \right\}$$

wherein $t \in \{1, \ldots, b_1\}$ is a bit index, $\sigma^2$ is a variance of noise superimposed during transmission, $u_k$ is the first decision variable, $Y_k$ is the first reception matrix, $Y_{k-1}$ is the second reception matrix, H is the Hermetian operator, $C_k$ is a constellation matrix, Re is a real part operator, trace { } is the trace operator delivering the sum of all diagonal elements of a matrix, $L_a(u_k^{(1)})=[L_a(u_{k,l}), \ldots, L_a(u_{k,b_1})]^T$ is a vector of a priori bit information with respect to the first sub-group of transmission bits, and $u_k^{(i)}$ is a reception candidate corresponding to the constellation matrix $C_k$.

Assuming that noise variance is constant over a frame, which is a reasonable assumption, all log-likelihood ratios are scaled by the constant factor $\sigma^2$. It should be noted that this has no effect on the hard output of an outer Viterbi or Max-Log-type APP decoder. However, the APP log-likelihood ratios of the outer decoder will also be scaled by the same factor. Even in a turbo scheme this will cause no degradation as long as only Max-Log components are applied, since the fed back a priori info is scaled. However, if a-priori information which is gained outside the turbo scheme is used the knowledge of the noise variance for correct weighting would be necessary.

As will be shown in the following and further to the above, when $C_k$ is an orthogonal design then the max-log approximation unit 80 shown in FIG. 9 may be further simplified.

The reason for this is that one may obtain decoupled expressions for the PSK symbols $C_{k,l}$, $l=1, \ldots, K$. Hence, in order to find the most likely transmitted data, only $KM_1^{1/K}$ comparisons are necessary instead of $M_1$.

Starting from (21), one may apply a standard space-time block code diversity combiner V. Tarokh, H. Jafarkhani, and A. R. Calderbank, *Space-Time Block Codes from Orthogonal Designs*, IEEE Transactions on Information Theory, 45(5): 1456-2467, June 1999, G. Bauch, J. Hagenauer, and N. Seshadri, *Turbo Processing in Transmit Antenna Diversity Systems*, Annals of Telecommunications, Special Issue: Turbo Codes—A Widespreading Technique, 56(7-8):455-471, August 2001, incorporated herein by reference, where the matrix $H_k$ of the channel coefficients is replaced by $Y_{k-1}$. This yields an equivalent system, or in other words a transformation of a multiple input multiple output MIMO channel model into a single input single output SISO channel model according to $$\hat{y}_{k,l} = \sqrt{a^{q_k}} \text{trace } \{Y_{k-1} Y_{k-1}^H\} C_{k,l} + \hat{n}_{k,l} \quad (37)$$

of K single-input single-output (SISO) channels with noise variance, wherein $\hat{y}_{k,l}$ is a reception symbol of the equivalent channel corresponding to a PSK symbol $c_{k,l}$, $\sqrt{a^{q_k}}$ is a transmitter side scaling factor at time k, $Y_k$ is the first reception matrix, $Y_{k-1}$ is the second reception matrix;

H is the Hermetian operator, $c_{k,l}$ is a PSK symbol, and $l= 1, \ldots, K$ is an index of PSK symbols.

The noise variance for the equivalent single input single output SISO model is given by $$\hat{\sigma} = \sigma^2 (a^{q_k}+1) \text{ trace } \{Y_{k-1} Y_{k-1}^H\} \quad (38)$$

With the approximation (35), one obtains $$\log p(c_{k,l}|\hat{y}_{k,l}, Y_{k-1}) = const + \frac{\sqrt{|v_k|}}{(|v_k|+1)\sigma^2} \text{ Re } \{\hat{y}_{k,l}^* c_{k,l}\} \quad (39)$$

and the max-log approximation unit 80 shown in FIG. 9 will then determine a posteriori probability log-likelihood ratios according to $$\sigma^2 L^{(1)}(\hat{u}_{k,t}) \approx \max_{\substack{c_{k,l} \\ u_{k,t}=+1}} \left\{ \frac{\sqrt{|v_k|}}{|v_k|+1} \text{ Re } \left\{ \hat{y}_{k,l}^* c_{k,l} + \frac{\sigma^2}{2} u_{k,l}^{(1)T} L_a(u_{k,l}^{(1)}) \right\} \right\} - \quad (40)$$

$$\max_{\substack{c_{k,l} \\ u_{k,t}=-1}} \left\{ \frac{\sqrt{|v_k|}}{|v_k|+1} \text{ Re } \left\{ \hat{y}_{k,l}^* c_{k,l} + \frac{\sigma^2}{2} u_{k,l}^{(1)T} L_a(u_{k,l}^{(1)}) \right\} \right\}$$

wherein $t \in \{1, \ldots, b_1\}$ is a bit index, $l \in \{1, \ldots K\}$ is a constellation symbol index, K is the number of PSK constellation symbols, $v_k$ is the first decision variable, * is a conjugate complex operator, Re is a real part operator, and $u_{k,l}$ is a reception candidate corresponding to the constellation symbol $c_{k,l}$.

Second Sub-Group of Transmission Bits—Hard Output Detection

Figure 10:
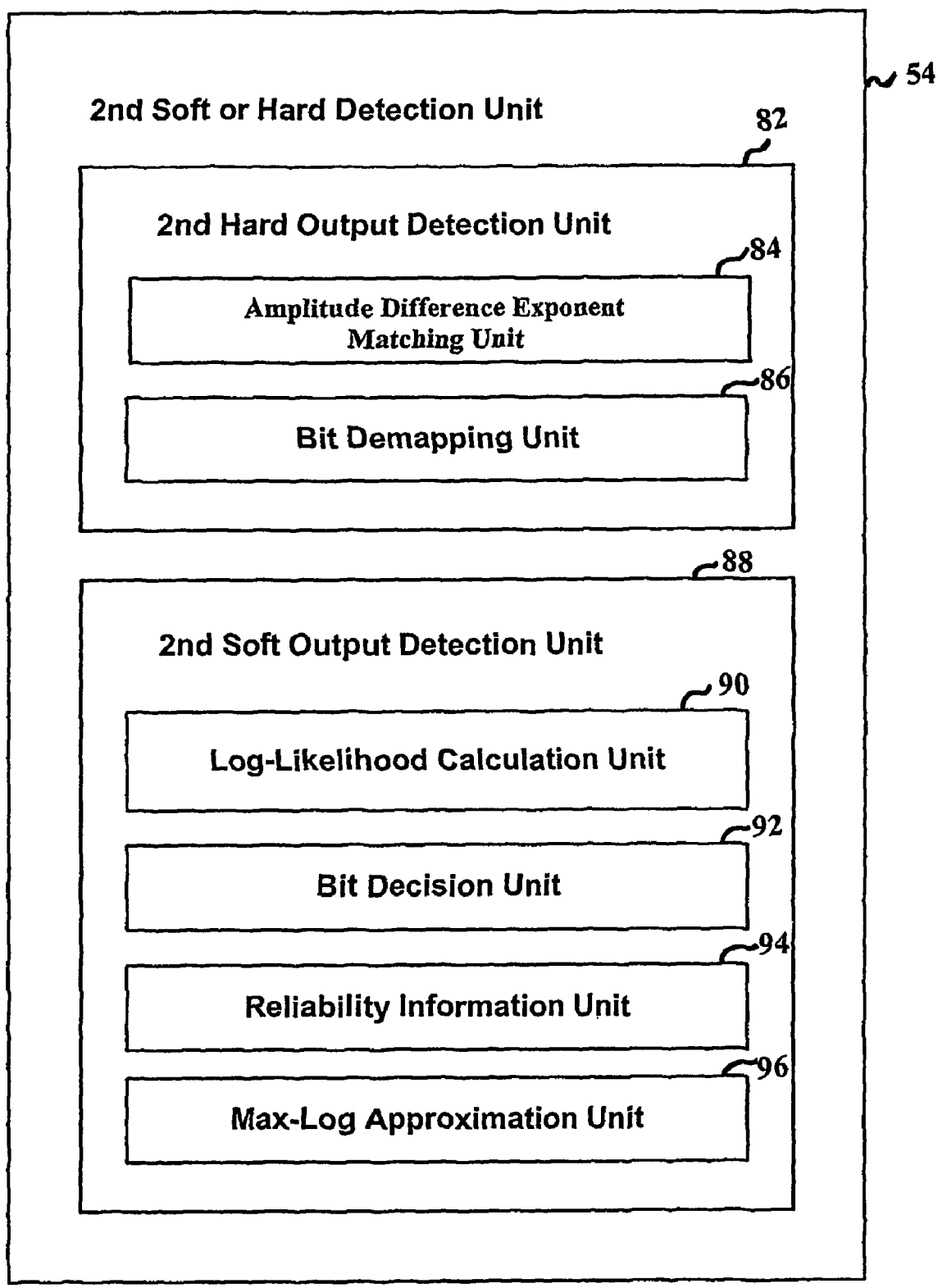
FIG. 10 shows a schematic diagram of the second soft or hard detection output unit shown in FIG. 6 or 8.

FIG. 10 shows a schematic diagram of the second output detection unit 54 shown in FIG. 6 or 8.

As shown in FIG. 10, the second output detection unit 54 comprises a second hard detection output unit 82 with an amplitude difference exponent matching unit 84 and a bit demapping unit 86.

From (23) one obtains $$v_k = \frac{\text{trace}\{Y_k Y_k^H\}}{\text{trace}\{Y_{k-1} Y_{k-1}^H\}} = a^{q_k} + \overline{N}_k, \tag{41}$$

where $$\overline{N}_k = \frac{\text{trace}\left\{\sqrt{a_k^q}\, Y_{k-1} C_k \overline{N}_k^H + \sqrt{a_k^q}\, \overline{N}_k C_k^H Y_{k-1}^H + \tilde{N}_k \tilde{N}_k^H\right\}}{\text{trace}\{Y_{k-1} Y_{k-1}^H\}}. \tag{42}$$

In view of the above, operatively the amplitude difference exponent matching unit 84 is adapted to determined a hard detection output qk according to $$\hat{q}_k = \arg\min_{q_k}\{|v_k - a^{q_k}|\}. \tag{43}$$

wherein $\hat{q}_k$ is an amplitude difference exponent to be determined, a is a pre-determined constant, $v_k$ is the first decision variable, and arg min is an operator determining the minimum of the operand over all possible values of amplitude difference exponents $q_k$.

Further, operatively the bit demapping unit 86 is adapted to obtain bits $u_k^{(2)}$ by demapping from $\hat{q}_k$.

Second Sub-Group of Transmission Bits—Soft Output Detection

As shown in FIG. 10, the second output detection unit comprises a second soft output detection unit 88 with a log-likelihood calculation unit 90, a bit decision unit 92, a reliability information unit 94, and a max-log approximation unit 96.

Operatively, the log-likelihood calculation unit 90 is adapted to determine log-likelihood ratios for the second sub-group of transmission bits according to $$L^{(2)}(\hat{u}_{k,t}) = \log\frac{(p(u_{k,t}) = +1 | Y_{k-1}, Y_k)}{(p(u_{k,t}) = -1 | Y_{k-1}, Y_k)} \tag{44}$$

wherein k is a time index, $p(u_{k,t}=+1|Y_k,Y_{k-1})$ is a conditional probability for $u_{k,t}=+1$ in view of the first reception matrix $Y_k$ and the second reception matrix $Y_{k-1}$, and $p(u_{k,t}=-1|Y_k,Y_{k-1})$ is a conditional probability for $u_{k,t}=-1$ in view of the first reception matrix $Y_k$ and the second reception matrix $Y_{k-1}$.

Further, operatively the bit decision unit 92 is adapted to determine a decision for the second sub-group of transmission bits according to $$\hat{u}_{k,t} = \text{sign}(L^{(2)}(\hat{u}_{k,t})) \tag{45}$$

Further, operatively the reliability information unit 94 is adapted to determine a reliability information for the second sub-group of transmission bits according to $$|L^{(2)}(\hat{u}_{k,t})|. \tag{46}$$

A further aspect of the present invention relates to the approximation of log-likelihood values operatively executed by the max-log approximation unit 96.

Here, it should be noted that noise $\overline{N}_k$ with respect to transmission of the second sub-group of transmission bits is not Gaussian. For computation of a soft-output with respect to the second sub-group of transmission bits, according to the present invention it is proposed to take the logarithm of (41) and to use (8), (20), (21), (22) to obtain $$\log\mu_k = \log\frac{\text{trace}\{Y_k Y_k^H\}}{\text{trace}\{Y_{k-1} Y_{k-1}^H\}} = \tag{47}$$

$$\log\{\text{trace}\{a^{q_k} H_k X_{k-1} X_{k-1}^H H_k^H + 2\,\text{Re}\{H_k X_k N_k^H\} + N_k N_k^H\}\} -$$

$$\log\{\text{trace}\{H_k X_{k-1} X_{k-1}^H H_k^H + 2\,\text{Re}\{H_k X_{k-1} N_{k-1}^H\} + N_{k-1} N_{k-1}^H\}\}.$$

Neglecting noise terms $N_k N_k^H$ and $N_{k-1} N_{k-1}^H$ and through approximation (47) with the first two terms of the Taylor series $$f(a+b) = f(a) + \frac{b}{1!} f'(a)\ldots$$

one may arrive at $$\log\mu_k \approx \log[a^{q_k}\text{trace}\{H_k X_{k-1} X_{k-1}^H H_k^H\}] + \tag{48}$$

$$\frac{\text{trace}\{2\,\text{Re}\{H_k X_k N_k^H\}\}}{a^{q_k}\text{trace}\{H_k X_{k-1} X_{k-1}^H H_k^H\}} - \log[\text{trace}\{H_k X_{k-1} X_{k-1}^H H_k^H\}] -$$

$$\frac{\text{trace}\{2\,\text{Re}\{H_k X_{k-1} N_{k-1}^H\}\}}{\text{trace}\{H_k X_{k-1} X_{k-1}^H H_k^H\}} = \log a^{q_k} + \breve{n}_k,$$

where $\hat{n}_k$ is real white Gaussian noise with variance $$\breve{\sigma}^2 = \frac{1+a^{q_k}}{a^{q_k}}\frac{4\sigma^2}{a^{z_k-1}\text{trace}\{H_k H_k^H\}}. \tag{49}$$

With the approximations (35) and $$a^{z_k-1}\text{trace}\{H_k H_k^H\} \approx \text{trace}\{Y_{k-1} Y_{k-1}^H\}, \tag{50}$$

one obtains $$\log p(q_k|Y_{k-1}, Y_k) = \text{const} + \frac{1}{2\breve{\sigma}^2}|\log\mu_k - \log a^{q_k}|^2 \approx \tag{51}$$

$$\text{const} + \frac{|u_k|\,\text{trace}\{Y_{k-1} Y_{k-1}^H\}}{8\sigma^2(1+|u_k|)}\left|\log\frac{u_k}{a^{q_k}}\right|^2.$$

As in (40), according to the present invention it is proposed to use the max-log approximation of the APP log-likelihood ratios and multiply them by $\sigma^2$ which yields an equation processed by the max-log approximation unit 96 according to $$\sigma^2 L^{(2)}(\hat{u}_{k,t}) \approx \tag{52}$$

$$\max_{\substack{q_k \\ u_{k,t}=+1}}\left\{\frac{|u_k|\,\text{trace}\{Y_{k-1} Y_{k-1}^H\}}{8(1+|u_k|)}\left|\log\frac{u_k}{a^{q_k}}\right|^2 + \frac{\sigma^2}{2}u_k^{(2)T}L_a(u_k^{(2)})\right\} -$$

-continued $$\max_{\substack{q_k \\ u_{k,t}=-1}} \left\{ \frac{|u_k| \text{ trace } \{Y_{k-1}Y_{k-1}^H\}}{8(1+|u_k|)} \left| \log \frac{u_k}{a^{q_k}} \right|^2 + \frac{\sigma^2}{2} u_k^{(2)T} L_a(u_k^{(2)}) \right\}$$

wherein $t \in \{b_1+1, \ldots, b_1+b_2\}$ is a bit index, $\sigma^2$ is a variance of noise superimposed during transmission, $u_k$ is the first decision variable, $Y_k$ is the first reception matrix, $Y_{k-1}$ is the second reception matrix, H is the Hermetian operator, $q_k$ is an amplitude difference exponent, trace { } is the trace operator delivering the sum of all diagonal elements of a matrix, and $L_a(u_k^{(2)}) = [L_a(u_{k,b_1}+1), \ldots L_a(u_{k,b_1+b_2})]^T$ is a vector of a priori bit information with respect to the second sub-group of transmission bits.

It should be noted that, as desired, the log-likelihood ratios are scaled by the same factor $\sigma^2$ as the log-likelihood ratios in (40).

Outer FEC Coding and Interleaving

A further aspect of the present invention relates to outer forward error correction coding and interleaving. This aspect starts from the understanding that bits $u_k^{(2)}$ appear to have a lower SNR and, therefore, higher error rate than the bits $u_k^{(1)}$. The outer forward error correction coding and interleaving channel coding scheme according to the present invention takes this difference into account.

Figure 11:
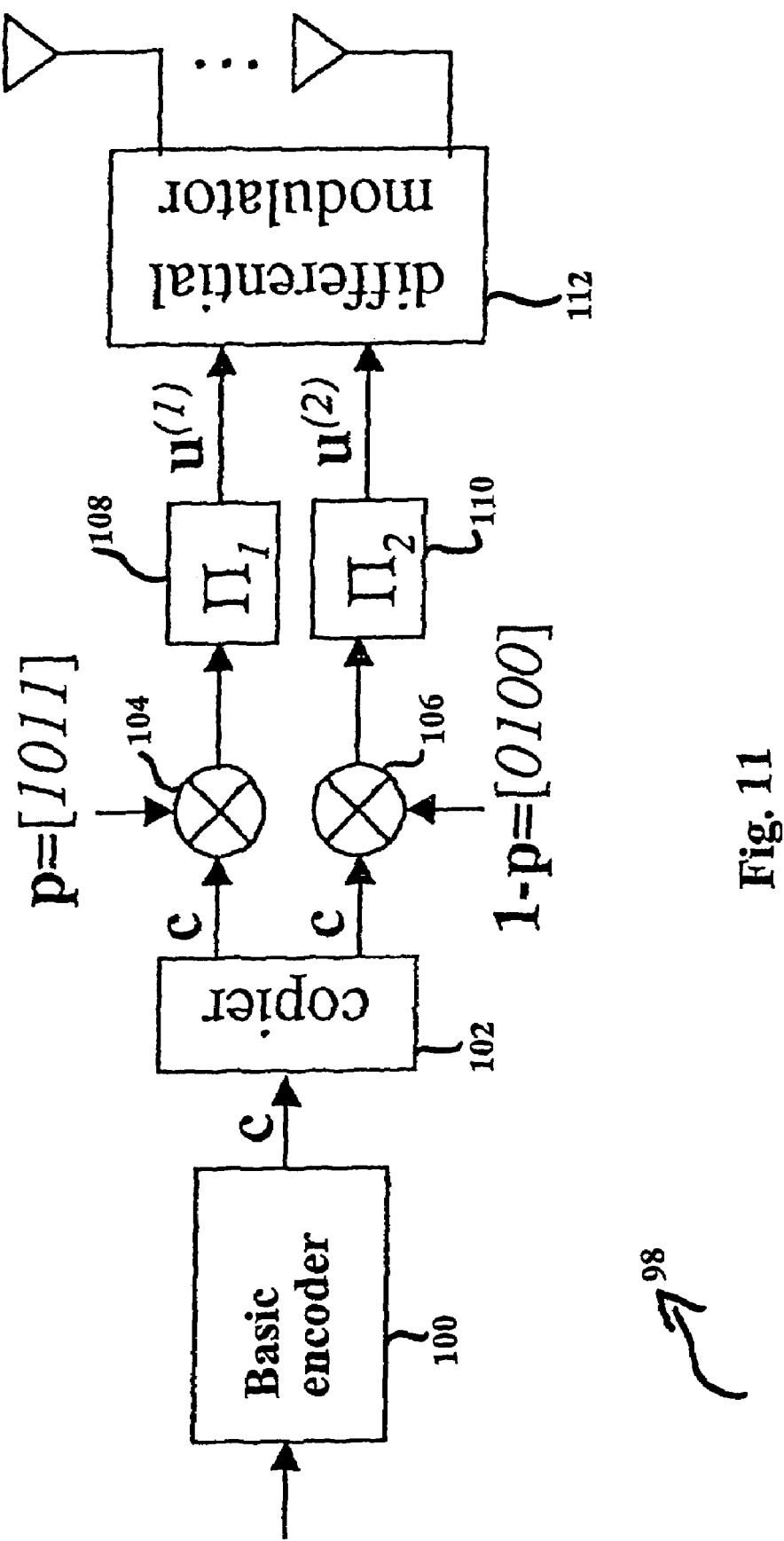
FIG. 11 shows a schematic diagram an apparatus for outer forward error correction coding in combination with a multiple-norm space-time transmit diversity modulation according to the present invention.

FIG. 11 shows a schematic diagram an apparatus for outer forward error correction coding in combination with a multiple-norm space-time transmit diversity modulation according to the present invention.

As shown in FIG. 11, the apparatus for outer forward error correction coding in combination with a multiple-norm space-time transmit diversity modulation 98 comprises a basic coder 100, a doubling unit 102, a first puncturing unit 104, a second puncturing unit 106, optionally a first interleaver 108, optionally a second interleaver 110, and a multiple norm space-time transmit diversity modulation unit 110.

Figure 12:
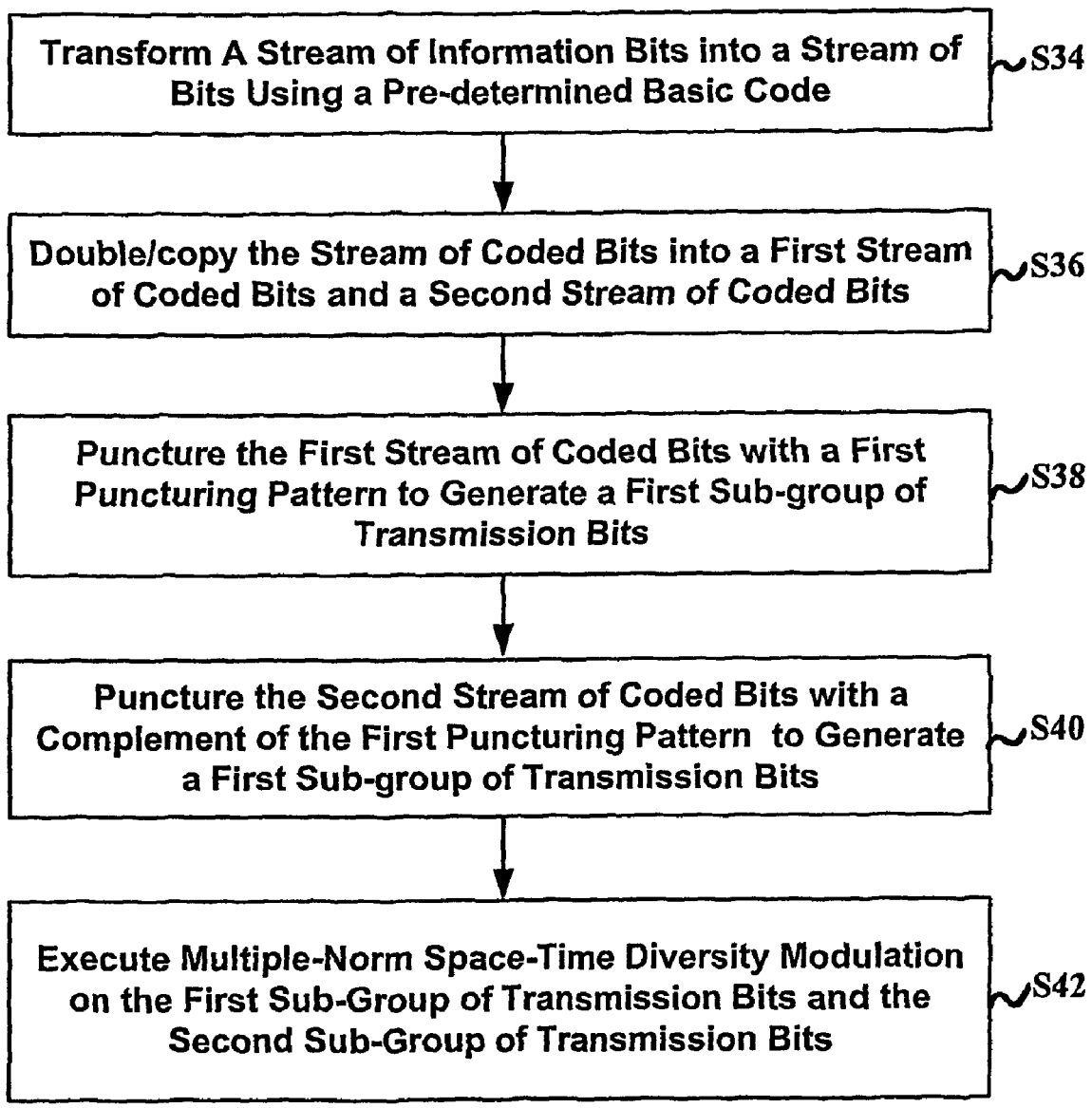
FIG. 12 shows a flowchart of operation of the apparatus for outer forward error correction coding in combination with a multiple-norm space-time transmit diversity modulation shown in FIG. 11.

FIG. 12 shows a flowchart of operation of the apparatus for outer forward error correction coding in combination with a multiple-norm space-time transmit diversity modulation shown in FIG. 11.

As shown in FIG. 12, operatively achieved by the basic coder 100, a stream of information bits is transformed into a stream of coded bits using a pre-determined basic code. In a step S36, operatively achieved by the doubling/copying unit 102, the stream of coded bits is doubled into a first stream of coded bits and a second stream of coded bits. In a step S38, operatively achieved by the first puncturing unit 104, the first stream of coded bits is punctured with a pre-determined puncturing pattern to generate a first sub-group of transmission bits. In a step S40, operatively achieved by the second puncturing unit 106, the second stream of coded bits is punctured with a complement of the pre-determined puncturing pattern to generate a second subgroup of transmission bits.

As shown in FIG. 12, the result of steps S34 to S42 is then forwarded to the multiple norm space-time transmit diversity modulation unit 110 being adapted to map the first group sub-group of transmission bits onto a constellation matrix of a differential unitary space-time modulation scheme, to determine a scaling factor from the second sub-group of transmission bits, and to set up a transmission matrix through differential encoding of the constellation matrix and a previously determined transmission matrix in combination with scaling by the scaling factor, in particular in the sense outlined above.

As shown in FIG. 12, optionally the first interleaving unit 108 is adapted to interleave the first stream of coded bits subsequent to puncturing thereof. Further, optionally the second interleaving unit 110 is adapted to interleave the second stream of coded bits subsequent to puncturing thereof.

In view of the above, one example for the basic code applied in the basic coding unit 100 may be, e.g., a rate compatible punctured code also referred to as RCPC code in the following and described, e.g., in J. Hagenauer, *Rate-Compatible Punctured Convolutional Codes (RCPC codes) and their Applications*, IEEE Transactions on Communications, 36(4):389-400, April 1998, incorporated herein by reference.

RCPC codes were introduced to obtain codes with different rate by puncturing code bits of a low rate basic or equivalently mother code according to a certain puncturing pattern p. The info bits are encoded by the basic code. Usually, only the code bits $c_k$ in positions where the puncturing pattern is $p_k=1$ are transmitted.

As shown in FIG. 12, according to the present invention data is encoded by the RCPC code and the coded bits are split into two streams according to the puncturing pattern of the RCPC code: The coded bits in positions where the puncturing pattern is 1 go to the first sub-group of transmission bits while the coded bits where the puncturing pattern is 0 go to the second subgroup of transmission bits.

At the receiver, the input log-likelihood ratios of the decoder are set to $L(u_k)=0$ for the punctured code bits. Further, the puncturing pattern has to be chosen carefully in order to optimize the performance.

In conclusion and as outlined above, for the space-time modulation scheme according to the present invention, it is proposed not to puncture code bits, but to transmit the less important bits which would normally be punctured in the set $u^{(2)}$ with the higher error probability. Therefore, the multiple-norm differential space-time diversity receiver will not face zeros for those bits, but less reliable soft inputs compared to the soft decoder inputs for bits $u^{(1)}$.

The invention claimed is:

1. A method of achieving differential multiple-norm space-time transmit diversity from a unitary space-time modulation scheme using at least two transmit antennas in a differential multiple norm space-time diversity receiver, comprising the steps:

dividing a group of transmission bits into a first sub-group of transmission bits and a second sub-group of transmission bits;

mapping the first sub-group of transmission bits onto a constellation matrix of a differential unitary space-time modulation scheme;

characterized by determining a scaling factor from the second sub-group of transmission bits;

setting up a transmission matrix through differential encoding of the constellation matrix and a previously determined transmission matrix in combination with scaling by the scaling factor; wherein $X_k$ is the transmission matrix;

$X_{k-1}$ is the previously transmitted transmission matrix;

$C_k$ is a constellation matrix of a differential unitary space-time modulation scheme; and k is a time index; and the scaling by the scaling factor comprises the steps determining an amplitude difference exponent $q_k \in \{-M_2+1, -M_2+2, \ldots, -1, 0, 1, \ldots, M_2-1$ from the second subgroup of transmission bits;

determining a scaling factor according to $[a^{9k}]^{1/2}$, wherein a is a predetermined constant;

scaling the result of differential encoding of the constellation matrix and a previously determined transmission matrix with a scaling factor according to $$X_k = [a^{9k}]^{1/2} X_{k-1} C_k.$$

2. A method according to claim 1, characterized in that the group of transmission bits comprises $\log_2(M_1) + \log_2(M_2)$ bits, wherein $M_1$ is the number of possible bit sequences of the first sub-group of transmission bits;

$M_2$ is the number of possible norm values of the transmission matrix, and wherein the step of dividing the group of transmission bits comprises the steps:

selecting a number of $b_1 = \log_2(M_1)$ bits in the group of transmission bits for the first sub-group of transmission bits $u_k^{(1)} = \{u_{k,1}, \ldots, u_{k,b1}\}^T$; and selecting a number of $b_2 = \log_2(M_2)$ bits in the group of transmission bits for the second sub-group of transmission bits $uk^2 = [u_{kb1+1}, \ldots, u_{k,b1+b2}]T$; and the step of determining the amplitude difference exponent comprises the steps:

calculating a set of $M_2$ integer values $d_k \in \{0, \ldots, M_2\}$ from a set of bit patterns $[P_1, \ldots, P\log_2(M_2)]$ covering permutations of the second sub-group of transmission bits for all pi $\in \{0,1\}$ according to:

$$d_k = \sum_{i=1}^{i=\log_2(M_2)} [p_i \cdot 2^i];$$

and establishing a pre-determined relation between bit patterns of the second sub-group of transmission bits and the set of integer values.

3. A method according to claim 2, characterized in that the step of calculating the amplitude difference exponent further comprises the steps:

mapping transmission bits of the second sub-group of transmission bits to an integer value $d_k$ according to the pre-determined relation established between bit patterns of the second sub-group of transmission bits and a set of integer values; and calculating the next amplitude difference exponent according to $$q_k = z_{k-1} - M_2 \lfloor (z_{k-1} + d_k)/M_2 \rfloor,$$

wherein $Z_k - 1$ is an amplitude exponent at instant of time $k-1$ $$X_{k-1} X_{k-1}^H = a^{zk-1} I_{n_T};$$

with $n_T$ is a number of transit antennas;

$I_{n_T}$ is a unity matrix of dimension Formel;

$\lfloor \cdot \rfloor$ is a floor function.

4. A method of multiple-norm differential space-time diversity reception using at least one reception antenna in a differential multiple norm space-time diversity receiver, wherein multiple-norm space-time modulated transmission matrices are set up at the transmitter side through differential space-time modulation from a unitary space-time modulation result for transmission of a second group of transmission bits characterized by the steps:

receiving a first reception matrix and a second reception matrix preceding the first reception matrix in time;

determining a decision matrix, a first decision variable, and a second decision variable through execution of matrix operations on the first reception matrix and the second reception matrix;

determining a first detection output in relation to the first sub-group of transmission bits on the basis of the decision matrix and the first decision variable; and determining a second detection output in relation to the second sub-group of transmission bits on the basis of the decision matrix and the first decision variable and the second decision variable; wherein the step of determining a decision matrix, a first decision variable, and a second decision variable comprises the steps:

combining the first reception matrix and the second reception matrix through a first matrix operation for determination of the decision matrix in relation to the first sub-group of transmission bits;

combining the first reception matrix and the second reception matrix though a second matrix operation for determination of a first decision variable in relation to the first sub-group of transmission bits and the second sub-group of transmission bits; and processing the second reception matrix though a third matrix operation for determination of a second decision variable in relation the second sub-group of transmission bits.

5. A method according to claim 4, characterized in that the second decision variable is determined according to $$. \text{trace}\{Y_{k-1} Y_{k-1}^H\}$$

wherein $Y_{k-1}$ is the second reception matrix.

6. A method according to claim 4, characterized in that the step of determining the first detection output in relation to the first sub-group of transmission bits is a hard output detection step; wherein the first detection ouput is determined according to $$\hat{C}_k = \arg\min_{C_k} \{\|Y_k - \sqrt{a^{q_k}} Y_{k-1} C_k\|^2\}$$
$$= \arg\max_{C_k} \{\text{trace}\{\text{Re}\{C_k Y_k^H Y_{k-1}\}\}\}$$

wherein $\hat{C}_k$ is the first detection output;

$\arg\min_{c_k}$ is an operator identifying a constellation matrix $C_k$ minimizing the operand; and $\arg\max_{c_k}$ is an operator identifying a constellation matrix $C_k$ maximizing the operand.

7. A method according to claim 4, characterized in that the step of determining the first detection output in relation to the first sub-group of transmission bits is a soft output detection step; wherein the likelihood ratios for the first sub-group of transmission bits are determined according to $$L^{(1)}(\hat{u}_{k,t}) = \log \frac{(p(u_{k,t}) = +1 | Y_{k-1}, Y_k)}{(p(u_{k,t}) = -1 | Y_{k-1}, Y_k)}$$

-continued $$= \log \frac{\sum_{\substack{C_k \\ u_{k,t}=+1}} p(C_k|Y_k Y_{k-1})}{\sum_{\substack{C_k \\ u_{k,t}=-1}} p(C_k|Y_k Y_{k-1})}$$

wherein k is a time index;

$u_k$ corresponds to the first sub-group of transmission bits and $u_k$, 1 is a transmission bit at position 1 in $u_k$;

P ($u_k$, 1=+1|$Y_k$, $Y_{k-1}$) is a conditional probability for $u_k$, 1=+1 in view of the first reception matrix $Y_k$ and the second reception matrix $Y_{k-1}$;

P ($u_k$, 1=−1|$Y_k$, $Y_{k-1}$) is a conditional probability for $u_k$, 1=−1 in view of the first reception matrix $Y_k$ and the second reception matrix $Y_{k-1}$; and $P(C_k|Y_k,Y_{k-1})$ is a conditional probability for transmission of the first sub-group of transmission bits through mapping onto constellation matrix $C_k$ at the transmitter side in view of the first reception matrix $Y_k$ and the second reception matrix $Y_{k-1}$; and the sum in the nominator is taken over all constellation matrices $C_k$ which are associated with uk, t=+1 and the sum in the denominator is taken over all constellation matrices $C_k$ associated with u k, t=−1.

8. A method according to claim 4, characterized in that the step of determining the second detection output in relation to the second sub-group of transmission bits is based on hard output detection; wherein the hard output detection step is achieved according to $$\hat{q}_{=arg\ minqk\{|vk-a^{qk}|\}}.$$

wherein $q_k$ is an amplitude difference exponent to be determined;

a is a pre-determined constant;

$v_k$ is the first decision variable; and arg min is an operator determining the minimum of the operand over all possible values of amplitude difference exponents $q_k$.

9. A method according to claim 4, characterized in that the step of determining the second detection output in relation to the second sub-group of transmission bits is based on soft output detection; wherein log-likelihood ratios for the second sub-group of transmission bits are determined according to $$L^{(2)}(\hat{u}_{k,t}) = \log \frac{(p(u_{k,t}) = +1 \mid Y_{k-1}, Y_k)}{(p(u_{k,t}) = -1 \mid Y_{k-1}, Y_k)}$$

wherein k is a time index;

$p(u_{k,1}=+1|Y_k, Y_k-1)$ is a conditional probability for $u_k$, 1=+1 in view of the first reception matrix $Y_k$ and the second reception matrix $Y_{k-1}$;

$p(u_{k,1}=-1|Y_k, Y_k-1)$ is a conditional probability for $u_{k,1}=-1$ in view of the first reception matrix $Y_k$ and the second reception matrix $Y_{k-1}$; and a decision for the second sub-group of transmission bits is determined according to $$\hat{u}_{k,t}=sign(L^{(2)}(\hat{u}_{k,t}))$$

and a reliability information for the second sigh-group of transmission bits is determined according to $$|L^{(2)}(\hat{u}_{k,t})|.$$

10. In an apparatus for outer forward error correction coding in combination with a multiple-norm space-time transmit diversity modulation, a method characterized by the steps:

transforming a stream of information bits into a stream of coded bits using a pre-determined basic code;

doubling the stream of coded bits into a first stream of coded bits and a second stream of coded bits;

puncturing the first stream of coded bits with a pre-determined puncturing pattern to generate a first sub-group of transmission bits;

puncturing the second stream of coded bits with a complement of the pre-determined puncturing pattern co generate a second sub-group of transmission bits;

mapping the first group sub-group of transmission bits onto a constellation matrix of a differential unitary space-time modulation scheme;

determining a scaling factor from the second sub-group of transmission bits; and setting up a transmission matrix through differential encoding of the constellation matrix and a previously determined transmission matrix in combination with scaling by the scaling factor.

11. A method according to claim 10, characterized in that it further comprises the step of interleaving the first stream of coded bits subsequent to puncturing thereof.

12. A method according to claim 10, characterized in that it further comprises the step of interleaving the second stream of coded bits subsequent to puncturing thereof.

13. An apparatus for achieving differential multiple-norm space-time transmit diversity from a unitary space-time modulation scheme using at least two transit antennas, comprising the steps:

a dividing unit adapted to map the first group sub-group of transmission bits onto a constellation matrix of a differential unitary space-time modulation scheme;

a mapping unit adapted to map the first group sub-group of transmission bits onto a constellation matrix of a differential unitary space-time modulation scheme;

a scaling unit adapted to determine a scaling factor from the second sub-group of transmission bits;

a transmission matrix set-up unit adapted to set up a transmission matrix through differential encoding of the constellation matrix and a previously determined transmission matrix in combination with scaling by the scaling factor; wherein $X_k$ is the transmission matrix;

$X_{k-1}$ is the previously transmitted transmission matrix;

$C_k$ is a constellation matrix of a differential unitary space-time modulation scheme; and k is a time index; and the scaling unit comprises:

an amplitude difference exponent unit adapted to determine an amplitude difference exponent $qk \in \{-M_2+1, -M_2+2, \ldots, -1, 0, 1, \ldots, M_2-1\}$ from the second sub-group of transmission bits;

a scaling factor unit adapted to determine a scaling factor according to $\sqrt{a^{q_k}}$, wherein a is a pre-determined constant;

a scaling factor multiplying unit adapted to multiply the result of differential encoding of the constellation matrix and a previously determined transmission matrix with a scaling factor according to $$X_k = \sqrt{a^{q_k}} X_{k-1} C_k.$$

14. An apparatus according to claim 13, characterized in that the group of
transmission bits comprises $\log_2 (M_1) + \log_2 (M_2)$ bits, wherein
$M_1$ is the number of possible bit sequences of the first sub-group of transmission bits;
$M_2$ is the number of possible norm values of the transmission matrix,
the dividing unit comprises
a first selection unit adapted to select a number of $b_1 = \log_2 (M_1)$ bits in the group of transmission bits for the first sub-group of transmission bits $u_k^{(1)} = [u_{k,l}, \ldots, u_{k,b1}]^T$; and
a second selection unit adapted to select a number of Formel bits in the group of transmission bits for the second sub-group of transmission bits $u_k^{(2)} = [u_{k,l}, \ldots, u_{k,b1}]^T$ and
the amplitude difference exponent unit comprises
an integer set calculation unit adapted to calculate a set of $M_2$ integer values $d_k \in \{0, \ldots, M_2\}$ from a set of bit patterns $[P_1, \ldots, P\log_2(M2)]$ covering permutations of the second sub-group of transmission bits for all Pi $\in \{0, 1\}$ according to:

$$d_k = \sum_{i=1}^{i=\log_2(M_2)} [p_i \cdot 2^i];$$

and
a relation establishment unit adapted to establish a pre-determined relation between bit patterns of the second sub-group of transmission bits and the set of integer values.

15. An apparatus according to claim 14, characterized in that the amplitude difference exponent unit further comprises:
a transmission bit mapping unit adapted to map transmission bits of the second sub-group of transmission bits to an integer value Formel according to the pre-determined relation established between bit patterns of the second sub-group of transmission bits and a set of integer values; and
an amplitude difference exponent calculation unit adapted to calculate the next amplitude difference exponent according to $$q_k = z_{k-1} - M_2 \lfloor (z_{k-1} + d_k)/M_2 \rfloor,$$

wherein
$Z_{k-1}$ is an amplitude exponent at instant of time; k−1 with $x_{k-1} x_{k-1}^H = a_{zk-1} I_{nT}$;
$n_T$ is a number of transmit antennas;
$I_nT$ is a unity matrix of dimension nT;
$\lfloor . \rfloor$ is a floor function.

16. An apparatus for multiple-norm differential space-time diversity reception using at least one reception antenna, wherein multiple-norm space-time modulated transmission, matrices are set up at the transmitter side through differential space-time modulation from a unitary space-time modulation scheme for transmission of a first sub-group of transmission bits and further through multi-norm scaling of the differential space-time modulation result for transmission of a second group of transmission bits, characterized by
a receiving unit adapted to receive a first reception matrix and a second reception matrix preceding the first reception matrix in time;
a decision information determination unit adapted to determine a decision matrix, a first decision variable, and a second decision variable through execution of matrix operations on the first reception matrix and the second reception matrix;
a first detection output unit adapted to determine a first detection output in relation to the first sub-group of transmission -bit's on the basis of the decision matrix and the first decision variable;
a second detection output unit adapted to determine a second detection output in relation to the second sub-group of transmission bits on the basis of the decision matrix and the first decision variable and the second decision variable; wherein
the decision information determination unit comprises:
a first matrix operation unit adapted to combine the first reception matrix and the second reception matrix through a first matrix operation for determination of the decision matrix in relation to the first sub-group of transmission bits;
a second matrix operation unit adapted to combine the first reception matrix and the second reception matrix through a second matrix operation for determination of a first decision variable in relation to the first sub-group of transmission bits and the second sub-group of transmission bits; and
a third matrix operation unit adapted to process the second reception matrix through a third matrix operation for determination of a second decision variable in relation the second sub-group of transmission bits.

17. An apparatus according to claim 16, characterized in that the third matrix operation unit is adapted to determine the second decision variable according to:

$$\text{trace } \{Y_{k-1} Y_{k-1}^H\}$$

wherein $Y_{k-1}$ is the second reception matrix.

18. An apparatus according to claim 16, characterized in that the first detection output unit comprises a first hard detection output unit adapted to determine the first detection output in relation to the first sub-group of transmission bits through hard output detection; wherein
the first hard detection output unit adapted to determine the first detection output according to $$\hat{C}_k = \arg\min_{C_k} \{\|Y_k - \sqrt{a^{qk}} Y_{k-1} C_k\|^2\}$$
$$= \arg\max_{C_k} \{\text{trace}\{\text{Re}\{C_k Y_k^H Y_{k-1}\}\}\}$$

wherein
$\hat{C}_k$ is the first detection output;
$\arg\min_{ck}$ is an operator identifying a constellation matrix $C_k$ minimizing the operand; and
$\arg\max_{ck}$ is an operator identifying a constellation matrix $C_k$ maximizing the operand.

19. An apparatus according to claim 16, characterized in that the first detection output unit comprises a first soft detection output unit adapted to determine the first detection output in relation to the first sub-group of transmission bits through soft output detection; wherein
the first soft detection output unit is adapted to determine log-likelihood ratios for the first sub-group of transmission bits according to $$L^{(1)}(\hat{u}_{k,t}) = \log \frac{(p(u_{k,t}) = +1 \mid Y_{k-1}, Y_k)}{(p(u_{k,t}) = -1 \mid Y_{k-1}, Y_k)}$$

$$= \log \frac{\sum\limits_{\substack{C_k \\ u_{k,t}=+1}} p(C_k \mid Y_k Y_{k-1})}{\sum\limits_{\substack{C_k \\ u_{k,t}=-1}} p(C_k \mid Y_k Y_{k-1})}$$

wherein k is a time index;

$u_k$ corresponds to the first sub-group of transmission bits and $u_{k,1}$ is a transmission bit at position 1 in $u_k$;

$P(u_{k,1}=+1 \mid Y_k, Y_{k-1})$ is a conditional probability for $u_{k,1}=+1$ in view of the first reception matrix $Y_k$ and the second reception matrix $Y_{k-1}$;

$P(u_{k,1}=+1 \mid Y_k, Y_{k-1})$ is a conditional probability for $u_{k,1}=-1$ in view of the first reception matrix $Y_{k-1}$ and the second reception matrix $Y_{k-1}$; and $p(ck \mid Y_k, Y_{k-1})$ is a conditional probability for transmission of the first sub-group of transmission bits through mapping onto constellation matrix $C_k$ at the transmitter side in view of the first reception matrix $Y_k$ and the second reception matrix $Y_{k-1}$; and the sum in the nominator is taken over all constellation matrices $C_k$ which are associated with $u_{k,t}=+1$ and the sum in the denominator is taken over all constellation matrices $C_k$ associated with $u_{k,t}=-1$.

20. An apparatus according to claim 16, characterized in that the second detection output unit comprises a second hard detection output unit adapted to determine the second detection output in relation to the second sub-group of transmission bits through hard output detection; wherein the second hard detection output unit is adapted to determine the hard output detection according to $$\hat{q}_k \arg \min_{q_k} \{|u_k - a^{q_k}|\}.$$

wherein $q_k$ is an amplitude difference exponent to be determined;

a is a pre-determined constant;

$v_k$ is the first decision variable; and arg min is an operator determining the minimum of the operand over all possible values of amplitude difference exponents $q_k$.

21. An apparatus according to claim 16, characterized in that the second detection output unit comprises a second soft detection output unit adapted to determine the second detection output in relation to the second sub-group of transmission bits through soft output detection; wherein the second soft detection output unit is adapted to determine log-likelihood ratios for the second sub-group of transmission bits according to $$L^{(2)}(\hat{u}_{k,t}) = \log \frac{(p(u_{k,t}) = +1 \mid Y_{k-1}, Y_k)}{(p(u_{k,t}) = -1 \mid Y_{k-1}, Y_k)}$$

wherein k is a time index;

$p(u_k, 1=+1 \mid Y_k, Y_{k-1})$ is a conditional probability for $u_{k,t}=+1$ in view of the first reception matrix $Y_k$ and the second reception matrix $Y_{k-1}$;

$p(u_{k,1}=-1 \mid Y_k, Y_{k-1})$ is a conditional probability for $U_{k,1}=-1$ in view of the first reception matrix $Y_k$ and the second reception matrix $Y_{k-1}$; and the second soft detection output unit is adapted to determine a decision for the second sub-group of transmission bits is according to $$\hat{u}_{k,t} = \text{sign}(L^{(2)}(\hat{u}_{k,t}))$$

and that the second soft detection output unit is adapted to determine reliability information for the second sub-group of transmission bits according to $$|L^{(2)}(\hat{u}_{k,t})|.$$

22. An apparatus for outer forward error correction coding in combination with a multiple-norm space-time transmit diversity modulation, comprising:

a coding unit adapted to transform a stream of information bits into a stream of coded bits using a pre-determined basic code;

a copying adapted to double the stream of coded bits into a first stream of coded bits and a second stream of coded bits;

a first puncturing unit adapted to puncture the first stream of coded bits with a pre-determined puncturing pattern to generate a first sub-group of transmission bits;

a second puncturing unit adapted to puncture the second stream of coded bits with a complement of the pre-determined puncturing pattern to generate a second sub-group of transmission bits; and a multiple norm space-time transmit diversity modulation unit adapted to map the first group sub-group of transmission bits onto a constellation matrix of a differential unitary space-time modulation scheme, to determine a scaling factor from the second sub-group of transmission bits, and to set up a transmission matrix through differential encoding of the constellation matrix and a previously determined transmission matrix in combination with scaling by the scaling factor.

23. An apparatus according to claim 22, characterized in that it comprises a first interleaver adapted to interleave the first stream of coded bits subsequent to puncturing thereof.

24. An apparatus according to claim 22, characterized in that it comprises a second interleaver adapted to interleave the second stream of coded bits subsequent to puncturing thereof.

25. A computer program product directly loadable into the internal memory of a differential multiple norm diversity space-time transmit diversity transmitter comprising software code portions for performing the steps of claim 1, when the product is run on a processor of the differential multiple-norm diversity transmitter.

26. A computer program product directly loadable into the internal memory of an apparatus for outer forward error correction coding in combination with a multiple-norm space-time transmit diversity modulation comprising software code portions for performing the steps of claim 4, when the product is run on a processor of the differential multiple-norm diversity transmitter.

27. A computer program product directly loadable into the internal memory of a differential multiple norm space-time diversity receiver comprising software code portions for performing the steps of claim 10, when the product is run on a processor of the differential multiple-norm diversity receiver.

* * * * *

UNITED STATES PATENT AND TRADEMARK OFFICE
CERTIFICATE OF CORRECTION

PATENT NO. : 7,616,703 B2
APPLICATION NO. : 10/545568
DATED : November 10, 2009
INVENTOR(S) : Gerhard Bauch It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 933 days.

Signed and Sealed this

Nineteenth Day of October, 2010

David J. Kappos
*Director of the United States Patent and Trademark Office*